(12) United States Patent
Li et al.

(10) Patent No.: US 7,565,610 B2
(45) Date of Patent: Jul. 21, 2009

(54) SYSTEM AND METHOD PROVIDING DETAILED NETWORK OBJECT PERFORMANCE INFORMATION TO LOCATE ROOT CAUSE

(75) Inventors: Gang Li, Needham, MA (US); Lee W. Sapiro, Hudson, MA (US)

(73) Assignee: EMC Corporation, Hopkinton, MA (US)

( * ) Notice: Subject to any disclaimer, the term of this patent is extended or adjusted under 35 U.S.C. 154(b) by 860 days.

(21) Appl. No.: 10/869,807

(22) Filed: Jun. 16, 2004

(65) Prior Publication Data

US 2005/0219151 A1    Oct. 6, 2005

Related U.S. Application Data

(63) Continuation-in-part of application No. 10/812,503, filed on Mar. 30, 2004.

(51) Int. Cl.
*G06F 15/177* (2006.01)
*G06F 15/173* (2006.01)

(52) U.S. Cl. .............. 715/736; 715/733; 715/734; 715/738; 715/969; 709/223; 709/224; 714/4; 714/47

(58) Field of Classification Search ............ 715/733, 715/734, 736, 738, 969; 709/223, 224; 714/4, 714/47
See application file for complete search history.

(56) References Cited

U.S. PATENT DOCUMENTS

| | | | |
|---|---|---|---|
| 5,367,670 A | 11/1994 | Ward et al. | |
| 5,375,199 A * | 12/1994 | Harrow et al. ............ | 715/771 |
| 5,506,955 A | 4/1996 | Chen et al. | |
| 5,557,547 A | 9/1996 | Phaal | |
| 5,559,958 A | 9/1996 | Farrand et al. | |
| 6,237,114 B1 | 5/2001 | Wookey et al. | |
| 6,272,537 B1 | 8/2001 | Kekic et al. | |
| 6,369,820 B1 | 4/2002 | Betram et al. | |
| 6,425,006 B1 | 7/2002 | Chari et al. | |
| 6,453,345 B2 | 9/2002 | Trcka et al. | |
| 6,457,139 B1 | 9/2002 | D'Errico et al. | |
| 6,636,250 B1 | 10/2003 | Gasser | |
| 6,654,803 B1 | 11/2003 | Rochford et al. | |
| 6,667,743 B2 | 12/2003 | Betram et al. | |
| 6,707,795 B1 | 3/2004 | Noorhosseini et al. | |
| 6,804,627 B1 | 10/2004 | Marokhovsky et al. | |
| 6,886,020 B1 | 4/2005 | Zahavi et al. | |
| 6,900,822 B2 * | 5/2005 | Germain et al. ............ | 715/736 |
| 6,952,208 B1 | 10/2005 | Arquie et al. | |
| 7,069,177 B2 | 6/2006 | Carley | |
| 7,076,397 B2 | 7/2006 | Ding et al. | |
| 7,082,441 B1 | 7/2006 | Zahavi et al. | |
| 7,139,819 B1 | 11/2006 | Luo et al. | |

(Continued)

OTHER PUBLICATIONS

Office Action dated Aug. 6, 2008 from U.S. Appl. No. 10/812,503, 21 pages.

(Continued)

*Primary Examiner*—Steven P Sax
*Assistant Examiner*—Grant D Johnson
(74) *Attorney, Agent, or Firm*—Daly, Crowley, Mofford & Durkee, LLP

(57) ABSTRACT

A method and apparatus displays time-based performance information for network objects to facilitate identification of a root cause of one or more triggers.

30 Claims, 28 Drawing Sheets

U.S. PATENT DOCUMENTS

| | | | |
|---|---|---|---|
| 7,197,559 | B2 | 3/2007 | Goldstein et al. |
| 7,315,985 | B1 | 1/2008 | Gauvin et al. |
| 7,356,452 | B1 | 4/2008 | Naamed et al. |
| 2002/0165933 | A1 | 11/2002 | Yu et al. |
| 2002/0198984 | A1 | 12/2002 | Goldstein et al. |
| 2003/0065986 | A1 | 4/2003 | Fraenkel et al. |
| 2003/0101023 | A1 | 5/2003 | Shah et al. |
| 2003/0167327 | A1 | 9/2003 | Baldwin et al. |
| 2004/0221190 | A1 | 11/2004 | Roletto et al. |
| 2004/0261030 | A1 | 12/2004 | Nazzal |
| 2005/0027858 | A1 | 2/2005 | Sloth et al. |
| 2005/0086646 | A1 | 4/2005 | Zahavi et al. |
| 2005/0091369 | A1 | 4/2005 | Jones |
| 2005/0219151 | A1 | 10/2005 | Li et al. |
| 2005/0223091 | A1 | 10/2005 | Zahavi et al. |
| 2005/0223092 | A1 | 10/2005 | Sapiro et al. |
| 2005/0223264 | A1 | 10/2005 | Arden et al. |

OTHER PUBLICATIONS

Office Action dated Nov. 27, 2007 from U.S. Appl. No. 10/812,503, 17 pages.

Notice of Allowance, Notice of Allowability dated Sep. 7, 2007 from U.S. Patent No. 7,315,985, 7 pages.

Final Office Action dated Apr. 9, 2007 from U.S. Appl. No. 10/335,330, 19 pages.

Office Action dated Oct. 11, 2006 from U.S. Appl. No. 10/335,330, 15 pages.

Office Action dated Dec. 31, 2007 from U.S. Appl. No. 10/812,509, 26 pages.

Final Office Action dated Aug. 20, 2008 from U.S. Appl. No. 10/812,509, 24 pages.

Response to Final Office Action dated Aug. 20, 2008 from U.S. Appl. No. 10/812,509.

Office Action dated Mar. 8, 2007 from U.S. Appl. No. 10/812,502.

Applicant's Response to Office Action dated Mar. 8, 2007 from U.S. Appl. No. 10/812,502.

Final Office Action dated Nov. 5, 2007 from U.S. Appl. No. 10/812,502.

Notice of Abandonment dated Jul. 9, 2008 from U.S. Appl. No. 10/812,502.

* cited by examiner

| Alerts | | | | | | |
|---|---|---|---|---|---|---|
| | | Object Name | Message | Created | Category | Acknowledged By |
| △ | ① | Lovas132 | ESNAPI get_element_serial_numberfailed | Thu Sep 19 11:15... | Health.General | |
| △ | ① | MVS7 | IBM_VTS:Average virtual volume mount=... | Fri Sep 20 14:04:32 | Performance.Host | |
| △ | ① | /dev/rdsk/c20d7s2 | Threshold exceeded on Response Time | Fri Sep 20 14:04:32 | Performance.Host | |
| △ | ② | losat204 | No WAL Archiver Agents found in Compo... | Wed Sep 25 15:11... | Health.General | |
| △ | ③ | boroditskyxxxa | Logon failure: Invalid Username/Password co... | Thu Sep 19 20:00... | Health.Server | ⊙ eccadmin |
| △ | ④ | losbe071 | Volume vg01:dev102(R) is unpaired. | Fri Sep 20 14:04:32 | Health.Server | ⊙ eccadmin |
| △ | ④ | losbe071 | Volume vg01:dev102(L) is unpaired. | Fri Sep 20 15:15:20 | Performance.Host | ⊙ eccadmin |
| △ | ④ | MVS7 | IBM_VTS:VTS$VTS1 not collecting enhanced... | Fri Sep 20 17:05:01 | Health.Server | ⊙ eccadmin |
| △ | ④ | MVS7 | IBM_VTS:Maximum virtual volume mount=3... | Fri Sep 20 17:35:04 | Health.General | ⊙ eccadmin |
| △ | ⑤ | boroditskyxxxa | User eccadmin has logged off from ECC | Fri Sep 20 17:15:32 | Performance.Host | ⊙ eccadmin |
| △ | ⑤ | boroditskyxxxa | User eccadmin has successfully logged onto... | Fri Sep 20 14:25:31 | Health.Server | ⊙ eccadmin |
| △ | ⑤ | losat200 | Collection for "WLA Daily 00" started for clarii... | Mon Sep 30 08:15... | Health.General | ⊙ eccadmin |
| △ | ⑤ | MVS7 | IBM_VTS:VTS$VTS1 cache miss percentage... | | | |

FIG. 4A

Performance Threshold Wizard

Review New Threshold Settings
Please confirm threshold changes and click "Finish" to save.

| New Thresholds / Existing Thresholds | Object Name | Metric | Threshold Method | Review | Alert |
|---|---|---|---|---|---|
| | ▱ DA-1A OC | Response Time Writes/second | Hourly Thresholds | ▤ ☐ | ☑ |

1402

To receive an alert in the Alerts view when thresholds trigger, check the box in the row of the threshold.

⇦ Back | Next ⇨ | Cancel | Help

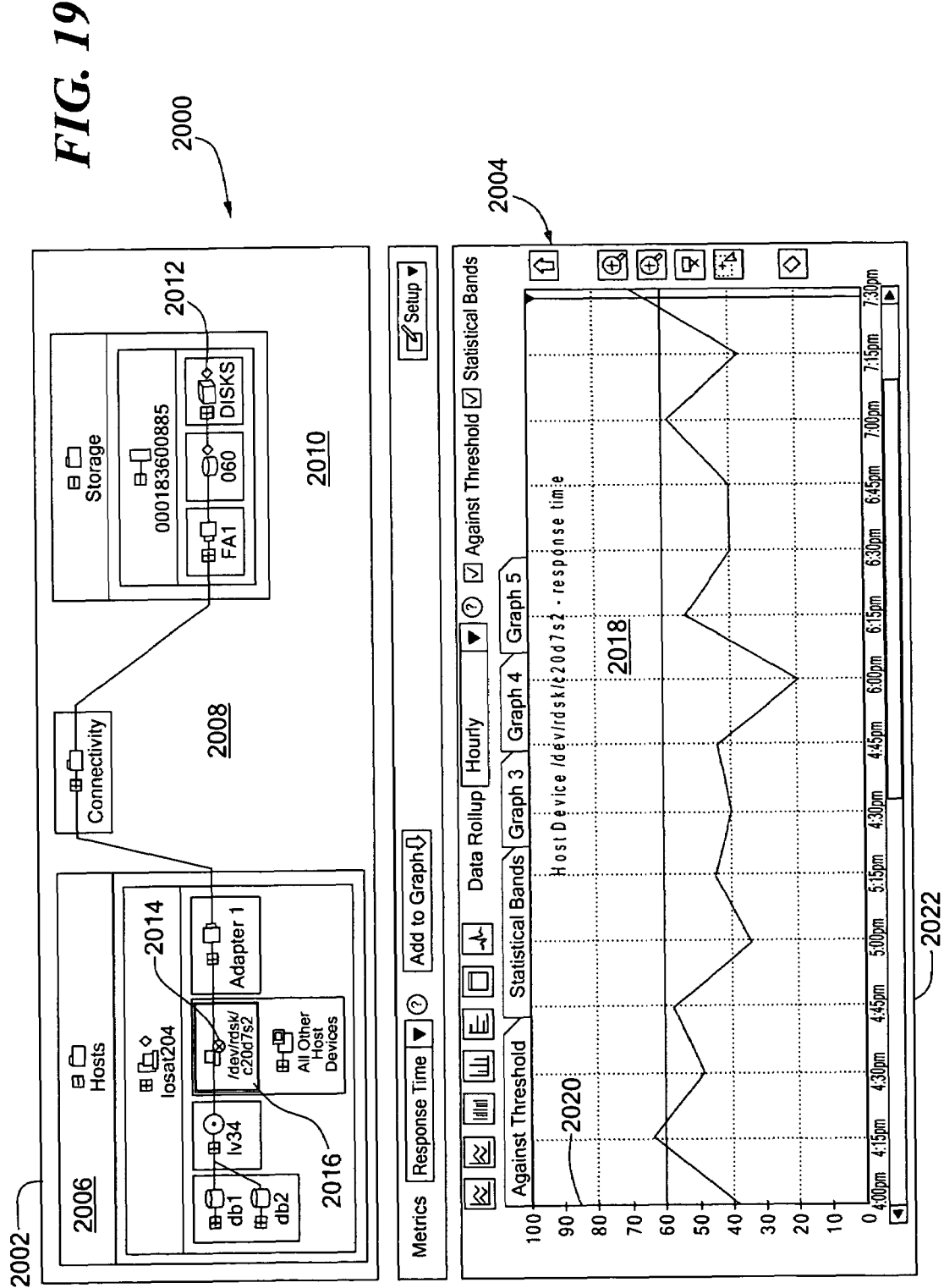

SYSTEM AND METHOD PROVIDING DETAILED NETWORK OBJECT PERFORMANCE INFORMATION TO LOCATE ROOT CAUSE

CROSS REFERENCE TO RELATED APPLICATIONS

The present application is a continuation-in-part of U.S. patent application Ser. No. 10/812,503, filed on Mar. 30, 2004, which is incorporated herein by reference.

STATEMENT REGARDING FEDERALLY SPONSORED RESEARCH

Not Applicable.

FIELD OF THE INVENTION

The present invention relates generally to communication networks and, more particularly, to systems and methods for monitoring network object performance.

BACKGROUND OF THE INVENTION

As is known in the art, communication networks are becoming increasingly complex. Locating networks objects having performance problems and failures may be relatively difficult. A system administrator may need to obtain an intimate working knowledge of the network topology, components, and operating parameters to even make a guess at a potential problem in the network. In addition, a network problem may not be a component failure but rather a device that is overloaded periodically or from time to time. Further, an administrator responsible for allocating network resources may find it quite difficult to correctly estimate the impact of moving various network devices from one location to another.

While there are known applications that show performance data, configuration information, which facilitates an understanding of the object relationships and their contribution to the problem, is not shown. Additionally, finding configuration information requires a user to piece together information from a logical map view and then switch to a view with physical connections. This requires a user to mentally combine the information in the two views, which may be quite difficult for complex networks with a variety of components, to determine the probable location of a problem. In addition, known systems may not collect object performance information with sufficient granularity to help a user identify intermittent bottlenecks or problems.

SUMMARY OF THE INVENTION

The present invention provides a system for monitoring network objects that allows a user to find the source of a performance problem with a graphical user interface. With this arrangement, a system administrator, for example, can locate trigger or alert causes, network performance bottlenecks and failed devices. While the invention is primarily shown and described in conjunction with storage area networks and storage devices, it is understood that the invention is applicable to networks in general in which it is desirable to monitor device performance data and locate root causes and alert sources.

In one aspect of the invention, a system for monitoring performance of network objects stores data for one or more performance metrics for network objects at predetermined time intervals. Based upon the collected performance data, the system stores time-stamped trigger and/or alert information and determines at least one potential root cause of the trigger/alert(s) in the network. In one embodiment, the system displays a topographical network map including network objects associated with the one or more triggers/alerts.

In another aspect of the invention, the system further provides a graphical display of performance data for one or more of the mapped network objects. The graphical display can include a threshold for readily determining times at which the threshold is exceeded.

In a further aspect of the invention, the graphical display of the performance data can include statistical bands. In one particular embodiment, the statistical bands are defined based upon standard deviations from historical performance data.

In another aspect of the invention, a summary view includes a series of cells covering periods of time. For example, the cells correspond to one hour and the aggregation of cells covers a day. Each cell can include an alert status for network objects. With this arrangement, a user can observe the summary view and ascertain the number of triggers/alerts generated by the network and at what times.

In a further aspect of the invention, a method of displaying network performance information includes storing performance information for objects in a network at predetermined time intervals, identifying network objects that are a potential root cause of one or more trigger firings in the network, and displaying a topographical map of the network including at least one of the identified network objects. The method can further include displaying a first performance region providing performance information for at least one of the identified network objects for a given time range, and displaying a second performance region providing graphical performance information for a plurality of the network objects at any specific time point within the time range.

BRIEF DESCRIPTION OF THE DRAWINGS

The invention will be more fully understood from the following detailed description taken in conjunction with the accompanying drawings, in which:

FIG. 4A is an exemplary display screen showing a list of various triggers;

FIG. 18 is an exemplary screen display showing trigger settings confirmation in accordance with the present invention.

FIG. 19 is an exemplary screen display having a first graph area showing performance information for network objects in accordance with the present invention;

DETAILED DESCRIPTION OF THE INVENTION

Figure 1:
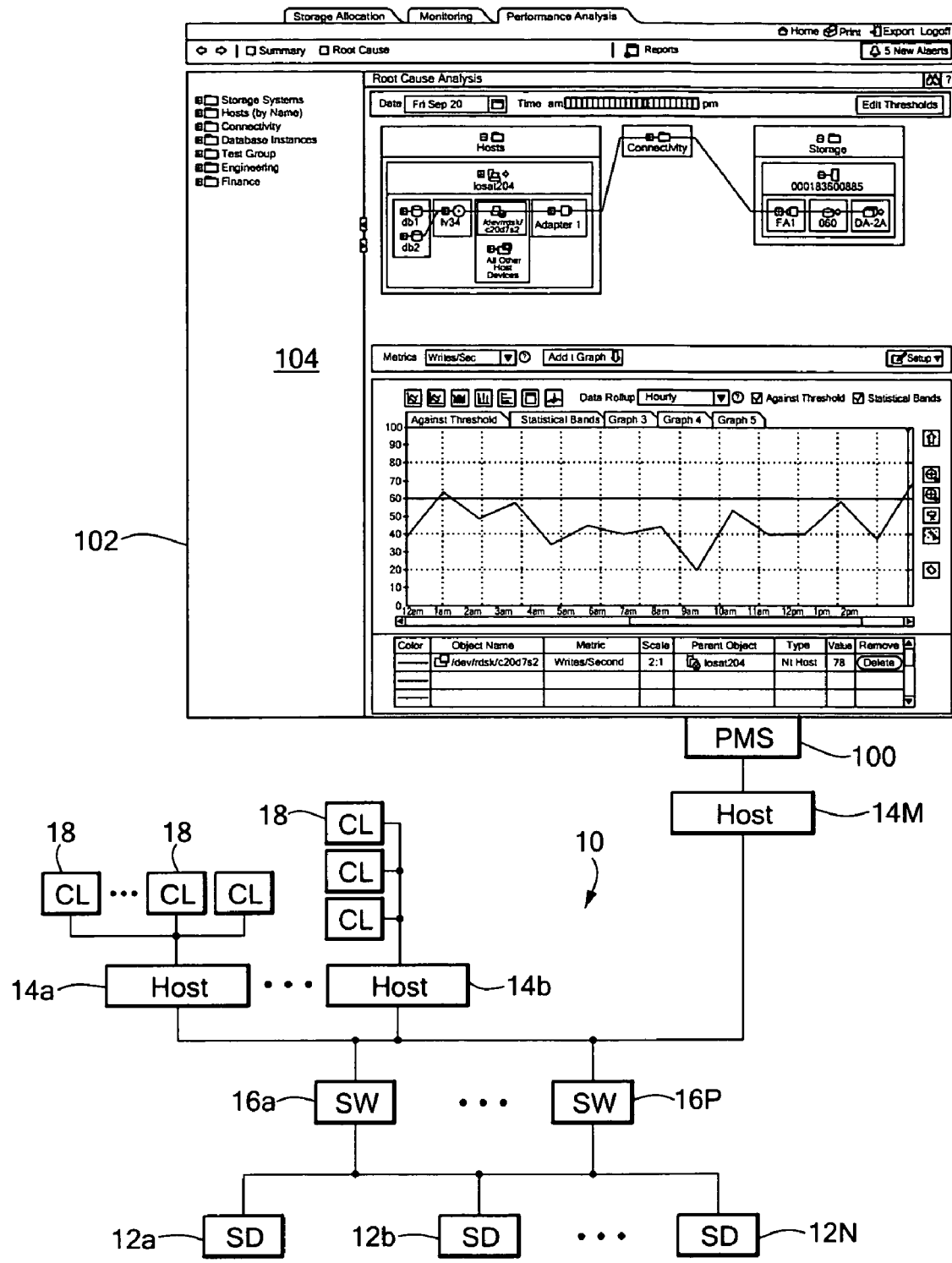
FIG. 1 is a schematic depiction of an exemplary network having a network object performance monitoring system in accordance with the present invention.

FIG. 1 shows an exemplary network object performance monitoring system 100 coupled to an illustrative storage area (SAN) network 10 in accordance with the present invention.

In general, the system 100 includes a display 102 providing a graphical user interface 104 for enabling a user to interactively identify network failures, trigger firings, alerts, and performance issues.

The performance monitoring system 100 can be coupled to the network 10 for monitoring the performance of the various network objects. The illustrated network 10 includes storage devices 12*a*-12N coupled to a series of host devices 14*a*-14M via connectivity devices 16*a*-16P, such as SAN switches. Clients 18, including the performance monitoring system 100, can be coupled to the various host devices 14.

It is understood that the network configuration, devices, etc., can be readily varied without departing from the present invention. In addition, additional types of network objects not specifically shown or described herein can form a part of the network as will be appreciated by one of ordinary skill in the art.

As used herein, the term "trigger" generally refers to some type of threshold that has been exceeded or otherwise passed. The term "alert" refers to an event, possibly from a trigger, that results in the generation of some type of message or other contact attempt to one or more designated persons, such as a system administrator. That is, certain triggers may generate an alert while others may not. In addition, triggers, as well as alerts, can have any number of priority levels.

Figure 2:
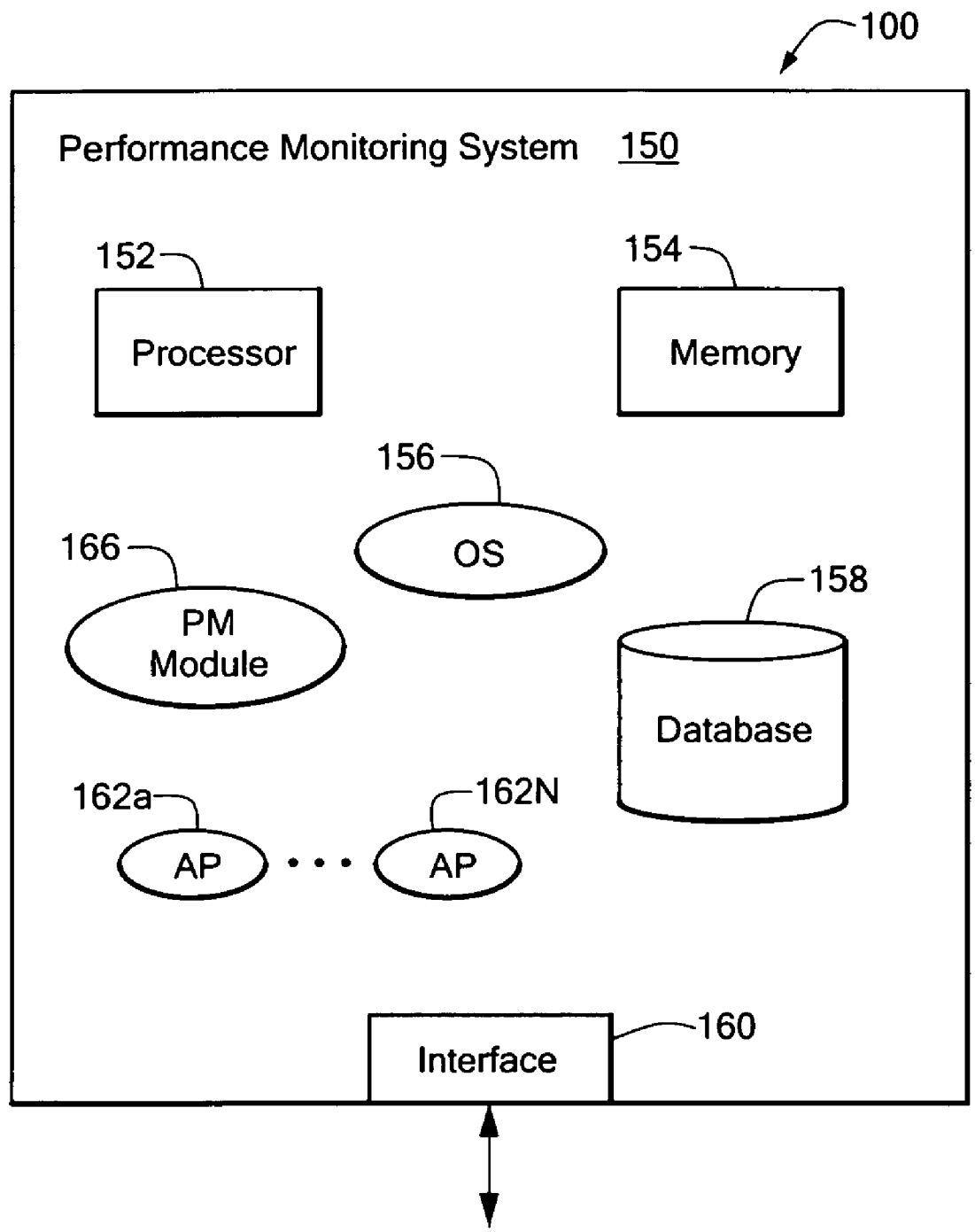
FIG. 2 is a schematic depiction of an exemplary architecture for the network object performance monitoring system of FIG. 1.

FIG. 2 shows an exemplary architecture 150 for the network object performance monitoring system 100 of FIG. 1. The system 100 includes a processor 152 coupled to a memory 154 that combine to generate the user interface screens described below. The system 100 runs an operating system 156, which can be provided from a variety of well known operating systems including Unix-based, Windows, and Linux-based systems. A database 158, which can be internal or external, can store data in a manner known to one of ordinary skill in the art. The system can also include an interface 160 for communicating with a network, such as the SAN 10 of FIG. 1. The system can also includes a series of applications 162*a*-164N can run on the system in a conventional manner.

The system 100 further includes a performance monitoring module 166 for monitoring network object performance, determining network triggers and/or alerts, and/or interacting with a user via a graphical user interface, as described in detail below. In general, the performance monitoring module 166 displays various screens showing object performance triggers/alerts and or data in summary and/or detailed views to enable a user to efficiently locate network object failures, alert sources, and/or performance issues.

It is understood that various architectures and partitions for hardware and software can be used to implement the present invention without departing from the present invention. Further, instructions for executing the present invention can be provided as software program instructions in any suitable programming language and/or various circuit devices including programmable devices.

Exemplary systems for collecting and/or displaying network topographical information are shown and described in U.S. patent application Ser. No. 09/641,227, filed on Aug. 17, 2000 and U.S. patent application Ser. No. 10/335,330, filed on Dec. 31, 2002, which are commonly owned by the same assignee as the present invention and incorporated herein by reference.

Figure 3:
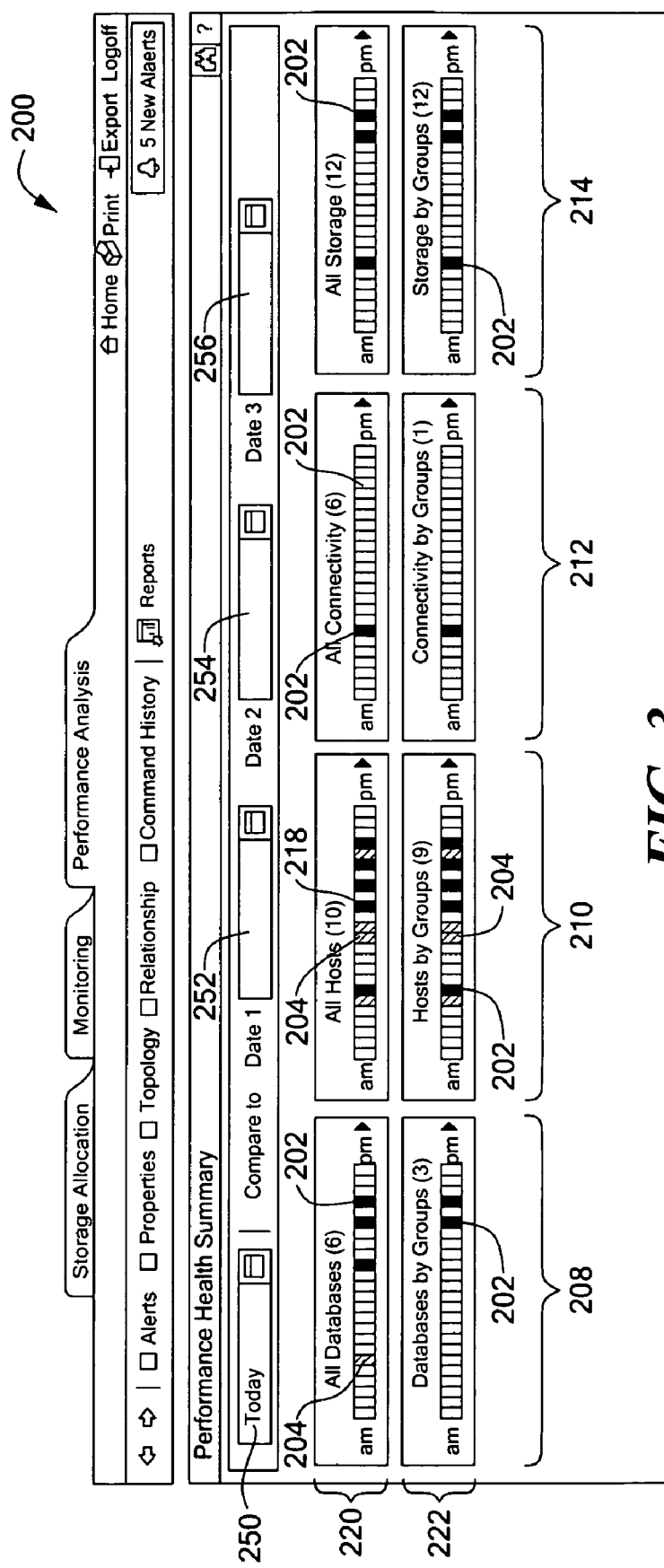
FIG. 3 is an exemplary display screen showing a summary of triggers detected in an illustrative network in accordance with the present invention.

FIG. 3 shows an exemplary display of a summary view 200 providing time-stamped triggers/alerts in accordance with the present invention. In an exemplary embodiment, the summary view 200 displays critical triggers 202 (e.g., dark or red), which may generate an alert, and medium triggers 204

(e.g., lighter or yellow) at associated times, here shown as cells 206, for a selected network. No-trigger conditions can be indicated as clear or green, for example. The summary view cells 206 correspond to predetermined time intervals, such as one hour. Each cell 206 can provide a trigger status (e.g., critical, medium, no trigger) for the corresponding time interval.

The network can include various types of objects including databases, hosts, connectivity devices, storage devices, and the like. The illustrative summary screen 200 includes regions for various types of network objects. In one particular embodiment, the summary screen 200 includes a database region 208, a host region 210, a connectivity region 212, and a storage region 214. Each of the regions 208, 210, 212, 214 can include a series of cells 216 corresponding to time intervals, e.g., one hour. The cells 216 can show a trigger status for each time interval across all, or selected ones, of the objects within the given region. For example, within the host region 210 a particular cell, e.g., cell 218, corresponding to the 2:00 p.m. hour indicates a critical alert status.

In the illustrated embodiment, each object type region includes a first series (e.g., row) of cells 220 for all network objects of the given type and a second series (e.g., row) of cells 222 for grouped objects of the given type. With this arrangement, a business entity, e.g., finance, can examine the performance of their networks objects.

With this arrangement, a user can readily determine network performance over the course of a given day or other selected period of time. For example, a user or system administrator can examine an entire network, group objects, etc., and expand cells to determine the root cause of a trigger. As described further below, by selecting a particular cell, such as a critical trigger cell, the system can provide a root cause view, which is described in detail below.

The summary view 200 can further include the capability to compare a selected day to one or more additional days. In an exemplary embodiment, the summary view 200 can contain a current calendar box 250 as well as first, second and third calendar boxes 252, 254, 256 that allow a user to select days for comparison. For example, a day can be selected in the first calendar box 252 that is one week prior to the present day in the current box 250 for comparison. This enables a user to determine whether an trigger is consistently generated at about the same time for a particular day of the week. This may identify, for example, a network performance problem generated by two relatively large backup jobs being scheduled at overlapping times.

Figure 3A:
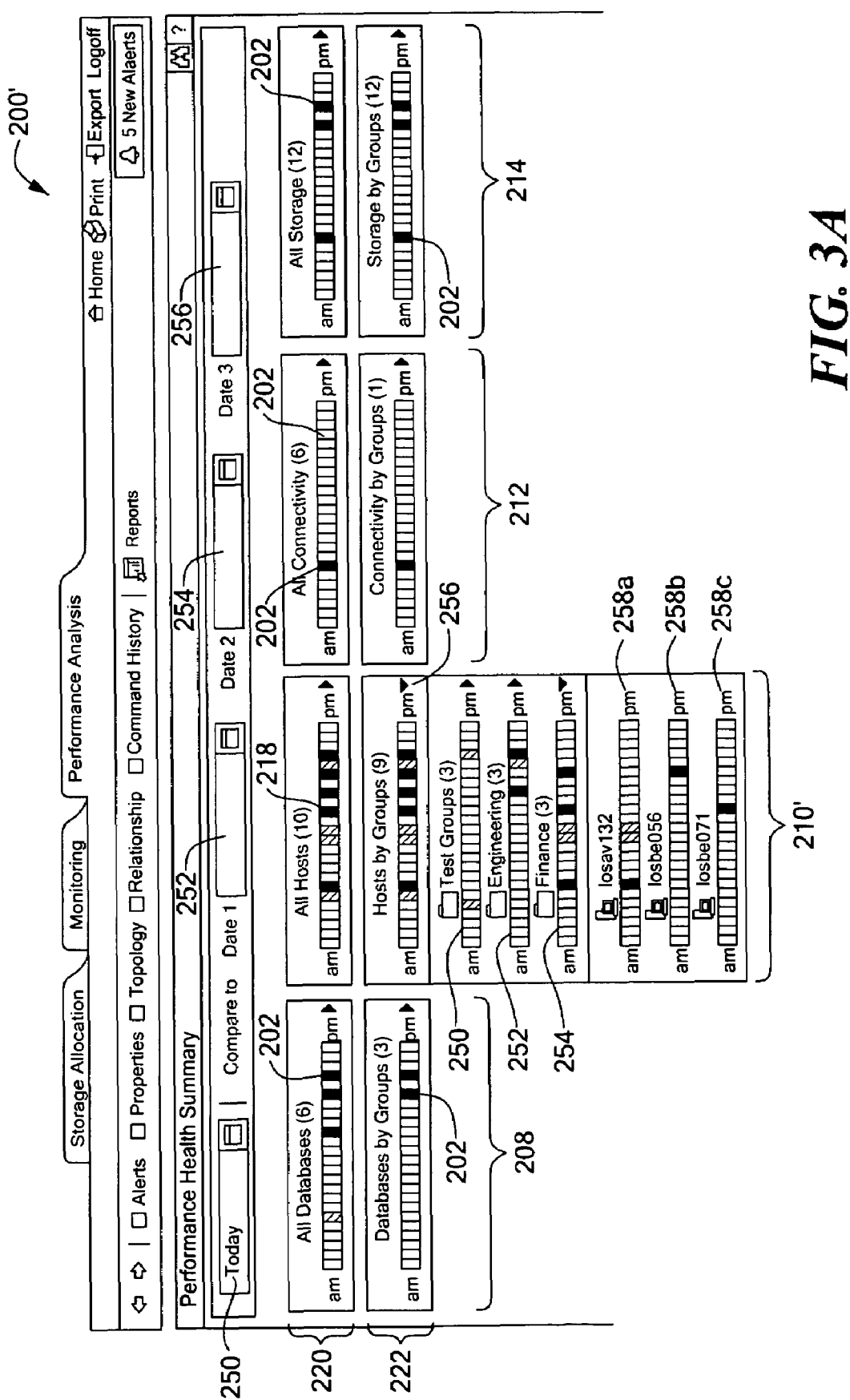
FIG. 3A is an exemplary expansion of the screen of FIG. 3.

FIG. 3A shows an exemplary expanded view 200' of the summary screen 200 of FIG. 3. The host region 210' is expanded to show user-defined host groups, here shown as test group 250, engineering 252, and finance 254. In one particular embodiment, the host groups are expanded by clicking on an expand icon 256. The finance user group 254 is further expanded to show three host devices 258a-c.

It is understood that the displayed cells can correspond to a wide variety of time intervals other than one hour. In addition, in other embodiments, the user can select the desired time interval. Further, the user can select a particular cell and expand the cell in time to obtain more detailed trigger information, as described in detail below.

It is understood that a wide variety of trigger/alert types and levels can be generated based upon one or more thresholds and/or criteria. For example, a critical alert can correspond to one or more parameters passing above predetermined thresholds.

Figure 4:
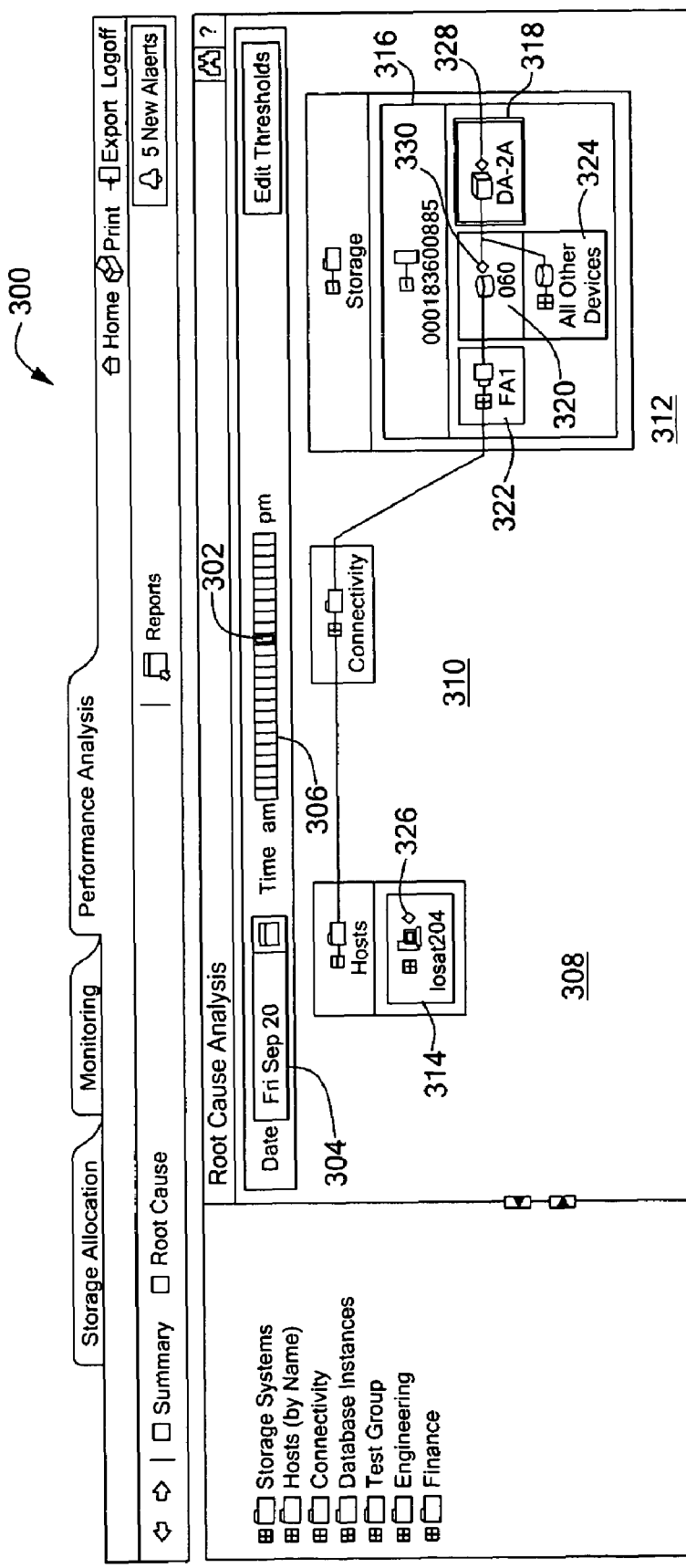
FIG. 4 is an exemplary display screen showing a map view with trigger information for a network in accordance with the present invention.

FIG. 4 shows a topographical map view 300 displaying logical and physical network objects, devices, and connections. In an exemplary embodiment, the view 300 corresponds to a selected cell 302 as shown in a date and time block 304, 306. It is understood that the selected cell 302 can correspond to a cell from the summary view 200 of FIG. 3. In one embodiment, the map view 300 for the cell can be generated by doubling clicking the corresponding cell in the summary view. In this topographical view, the link between network configuration and performance can be examined, as described more fully below. The map view 300 provides a navigational tool to guide a user finding the source or contributor to a problem from real time and historical configuration information.

FIG. 4A shows an exemplary alert screen 380 listing triggers and/or alerts from which the topographical map view 300 can be launched by clicking on a listed trigger. In one particular embodiment, the triggers are listed by priority/time. The list screen 380 can include a priority column 382 indicating a priority level for each trigger. An object name column 384 can identify the object associated with each trigger and a message column 386 can provide some information associated with the trigger, such as non-enabled storage arrays have been detected. A time-stamp column 388 can indicate a time associated with the alert and a category column 390 can indicate a trigger category, such as performance, health, etc. A further column 392 can indicate whether the responsible party has acknowledged the trigger/alert. It is understood that triggers at or above predetermined priority level can generate an alert that results in an attempt to contact a system administrator, such as by pager.

Referring again to FIG. 4, in one embodiment, the map view 300 includes a host region 308, a connectivity region 310, and a storage region 312. In the illustrated embodiment, the network objects associated with the trigger for the selected cell 302 are shown. In the host region 308, a first host 314 (labeled losat204) is shown and in the storage region 312 a storage object 316 (labeled 000183600885) is shown with an associated disk adapter 318 (labeled DA-2A), a disk device 320 (labeled 060) and an adapter 322 (labeled FA1). An expandable icon 324 for other devices coupled to the disk 320 is also shown.

The map view can display objects using a variety of criteria based upon performance, trigger, user focus, etc. In general, it is not desirable to show an excessive number of objects as useful information may be hidden. For example, when focused on a particular object, paths of directly connected objects (physically or logically) may be shown to create an end-to-end map. When focused on an object in a particular category (e.g., hosts, connectivity, storage), more related objects and details can be revealed in that area. For unfocused categories, objects with performance problems may be shown, and optionally objects associated with an identified problem object. That is, objects can be displayed to show an end-to-end path for a performance problem.

In the exemplary map view, a first mark 326 is associated with the first host 314, a second mark 328 is associated with disk adapter 318, and a third mark 330 is associated with the disk 320. The marks 314, 316, 318 indicate that these objects, for which there can be various associated device, may be potential causes of the trigger. In addition, a system administrator will readily recognize that the other devices 324 can contribute to the load on the disk device 320. That is, the overall load on the disk device 320 may be excessive and the cause of the trigger.

Figure 5:
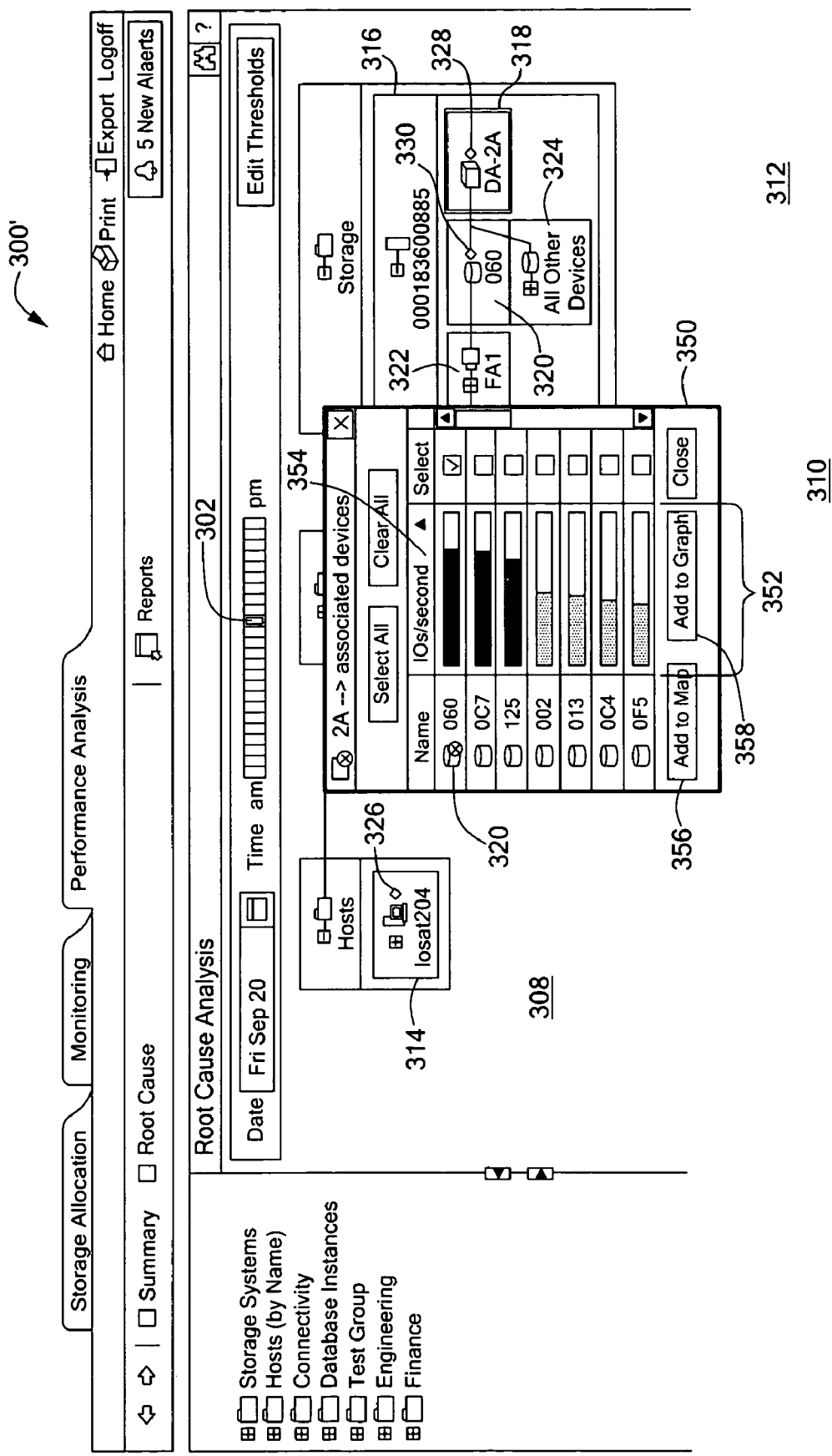
FIG. 5 is an exemplary display screen showing a map view with network object metric information in accordance with the present invention.

FIG. 5 shows a map view 300' after expanding, such as by clicking on, the other devices 324 icon shown in FIG. 4 where like reference numbers indicate like elements. The map view 300' includes a display 350 listing the disk device 320 and the other devices coupled to the disk device. In an exemplary embodiment, the listing 350 also includes a graphical display 352 of a listed metric, here shown as IOs/second (input/output operations per second) 354. The display box 350 can further include an Add to Map button 356 for adding a listed device to the map and/or an Add to Graph button 358 for adding a device to a graphical display, as explained more fully below.

The listed devices 350 contribute to the load on the disk device 320 as shown by the graph of IOs/second. In the illustrated view, the disk device 320 is marked, here shown as an X in a circle, to indicate that this device is exceeding a (IOs/second) threshold. As described more fully below, the threshold for generating a trigger can be selected by the user. Thus, the root cause of the trigger has been identified by the user.

Figure 6:
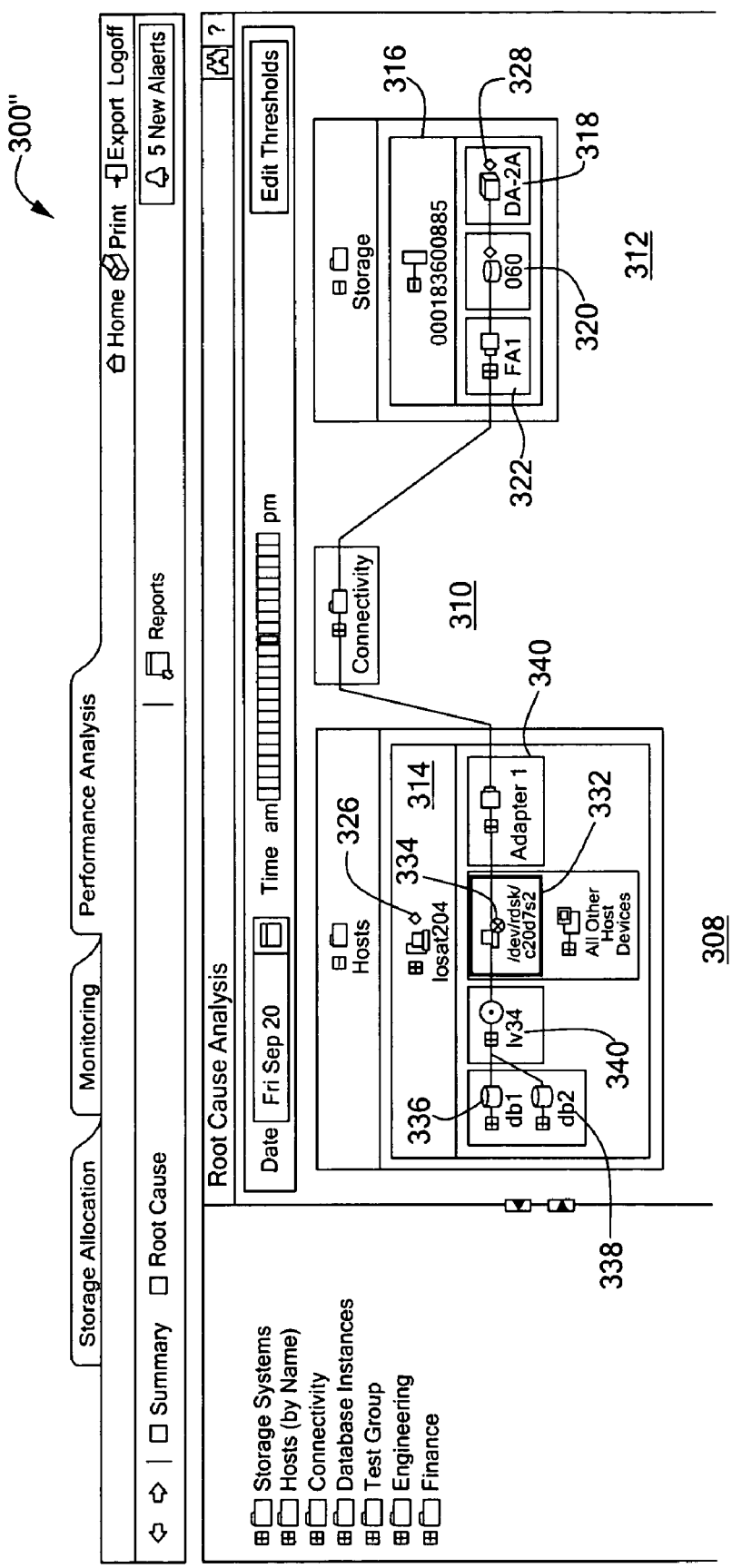
FIG. 6 is an exemplary display screen showing a further map view with trigger information for a network in accordance with the present invention.

FIG. 6 shows a map view 300" having an expansion of the first host 314 (losat204) flagged by the first mark 326. The host 314 includes a client device 332 (labeled c20d7s2) marked 334 (by an X in the circle) as being the root cause of the trigger. The host 314 further includes first and second databases 336, 338 with a logical volume 340. An adapter 340 couples the client device 332 to the connectivity icon in the connectivity region 310. In an exemplary embodiment, the root cause client device 332 is visually emphasized, shown here as having a more prominent border.

In an exemplary embodiment, the client device 332 has exceeded a threshold one or more times. Note that the objects marked 314, 320, 328 by the first second and third marks 326, 330, 328 are connected in the network. The marks indicate that a trigger has fired, e.g., one or more thresholds has been exceeded.

Figure 7:
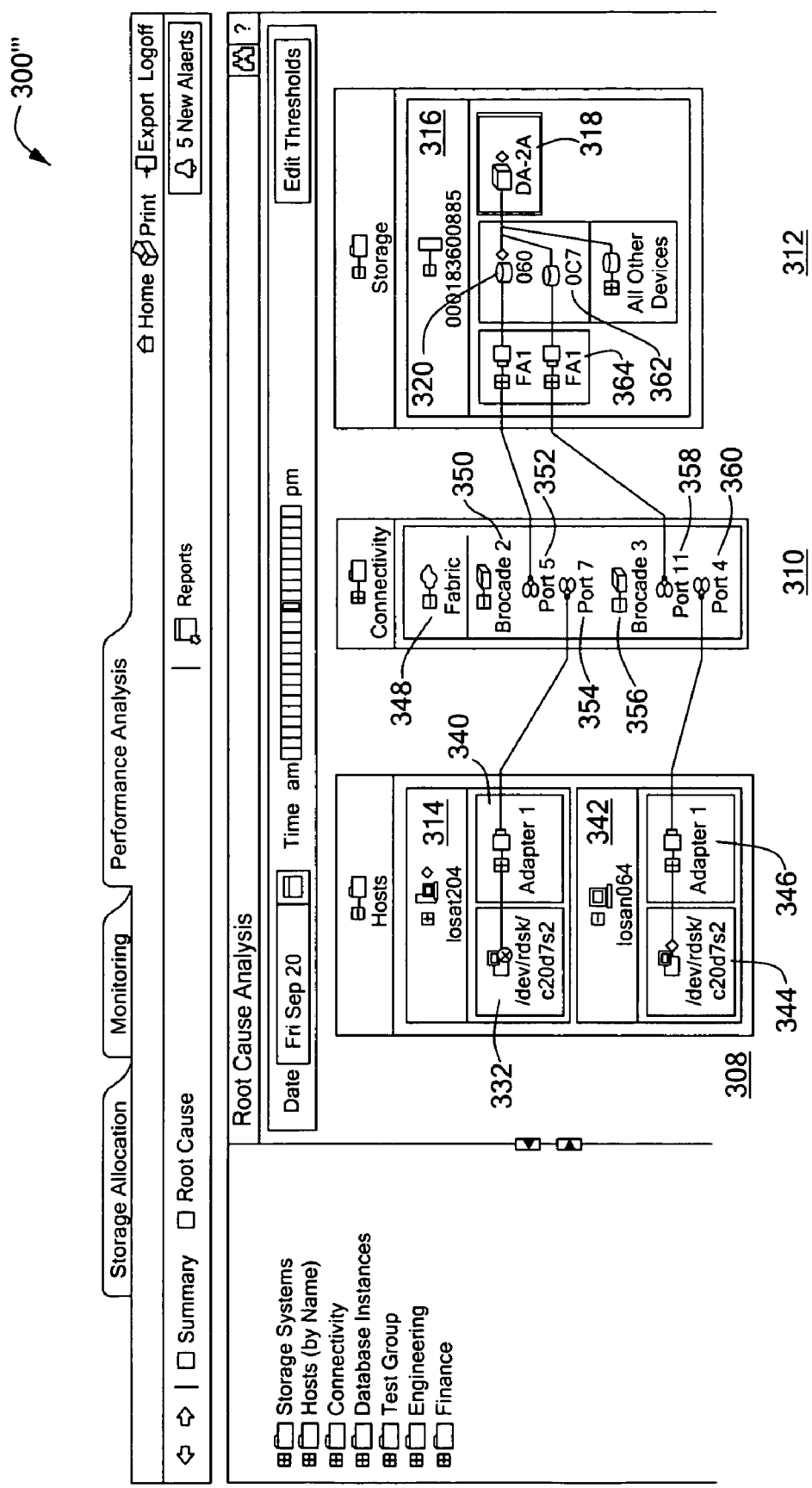
FIG. 7 is an exemplary display screen showing an expanded map view with trigger information for a network in accordance with the present invention.

FIG. 7 shows a further map view 300'" with exemplary expanded host, connectivity, and storage information. The host region 310 includes the first host 314 with associated client device 332 and adapter 340 and a second host 342 (labeled losan064) with a client device 344 and adapter 346. The connectivity region 310 shows a first fabric 348 with an associated first switch device 350 having a first port connection 352 to the storage device 316 and second port connection 354 to the first host 314 and a second switch device 356 having a first port 358 coupled to the storage object 316 and a second port 360 coupled to the second host 342. In the storage region 312, a further disk device 362 (labeled OC7) is shown, which was listed in the box 350 of FIG. 5, along with an adapter 364.

The map can be expanded as desired to obtain further topographical information. With this arrangement, flexibility to view particular aspects of the network is provided. This flexibility can be used to locate the source of triggers as well as to configure components, move devices, and generally allocate resources.

Figure 8:
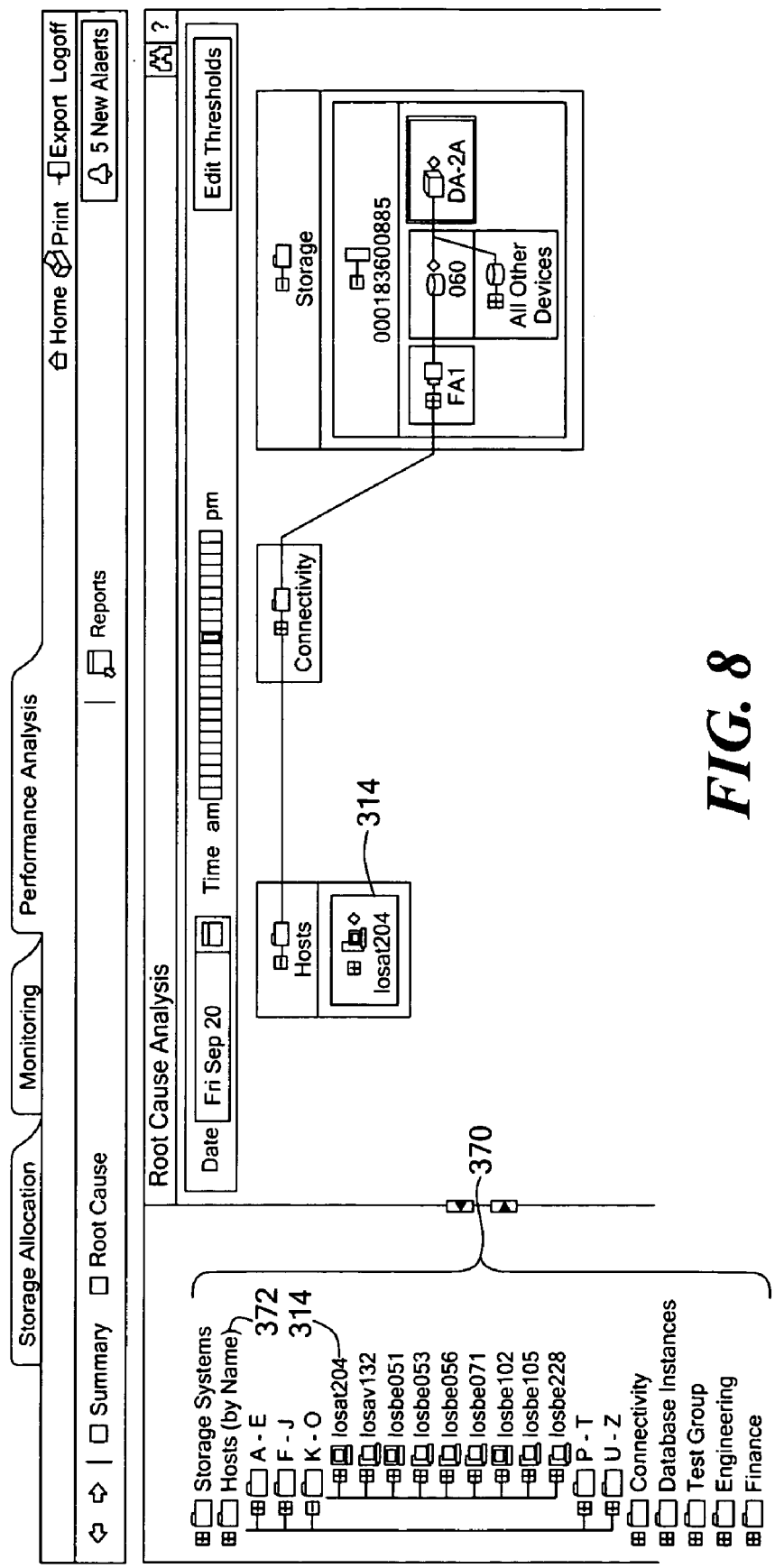
FIG. 8 is an exemplary display screen showing an expanded hierarchical depiction of network objects corresponding to a map view in accordance with the present invention.

Referring now to FIG. 8, the map view 300 can also include an expandable hierarchical view 370 of network object types that can be expanded. For example, a host icon 372 in the hierarchical view 370 can be expanded so that the first host 314 (losat204) can be seen. Other objects shown in the map can be listed after expansion of the appropriate hierarchical object.

In another aspect of the invention, the performance of selected network objects can be graphically displayed for a desired time interval. When drilling down through the map from a cell for which a trigger was flagged, one or more metrics for the selected network object can be graphically displayed. With this arrangement, the time at which a threshold, for example, was exceeded by an object, such as a host device, can be identified.

Figure 9:
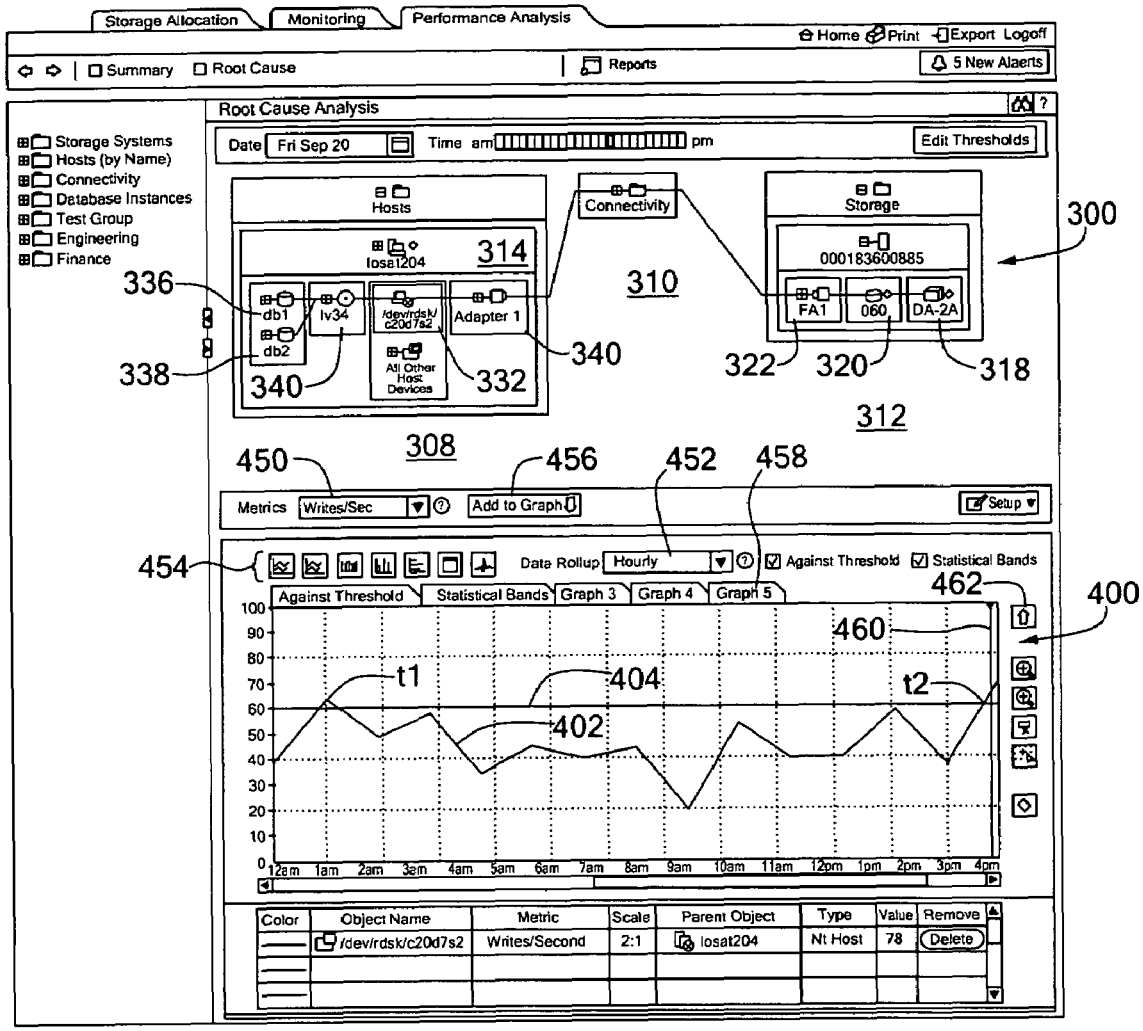
FIG. 9 is an exemplary display screen showing a graphical display corresponding to network object in a map view in accordance with the present invention.

FIG. 9 shows an exemplary graphical display 400 below the map 300 described above, of a given metric, here shown as writes per second, over time for the client device 322 associated with the first host device 314 (losat204). The number of writes per second 402 for the client device 322 is plotted over time, here shown on an hourly basis, against a threshold 404. As can be seen, at first and second times t1 (1 a.m.), t2 (4 p.m.), the number of writes/sec 402 performed by the host device 322 exceeds the selected threshold 404, which is set to 60 writes/sec in the illustrated embodiment.

The graphical display 400 can include a metric selection menu 450 from which a list of metrics can be displayed. The user can select the desired metric for display. Exemplary metrics include writes per second, response time, I/O operations per second, and the like. It is understood that different metrics may be available for different types of objects.

The graphical display 400 can also include a data rollup selection menu 452 from which a user can select a time interval for the graphed results. Time intervals can include hourly (as shown), real time, interval, daily, weekly, monthly, and the like. By selecting a different time interval, the graphed information can be updated. A series of graph type buttons 454 can enable a user to select a desired graphical format, e.g., line, area, and bar graphs and horizontal and vertical histograms.

A device from the map 300 can be selected and added to the graph using an Add to Graph button 456. An object from the map, such as an object within the other device list 350 in FIG. 5, can be selected and graphed. In one particular embodiment, a tab 458 can be added/named above the graph corresponding to the device.

Figure 9A:
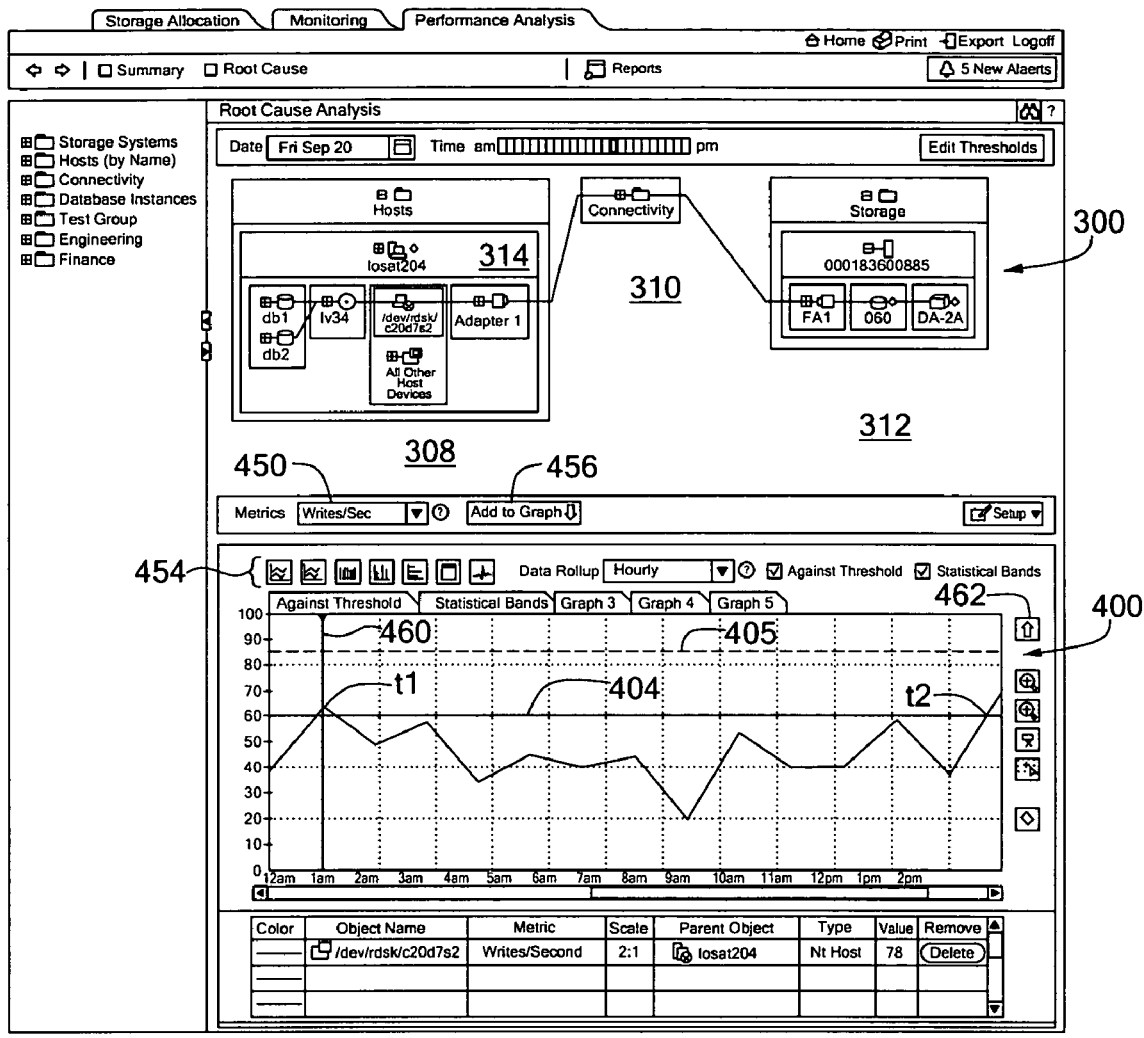
FIG. 9A is an exemplary display screen showing a graphical display providing a mechanism to show map information synchronized to a selected time in accordance with the present invention.

The graphical display 400 can also include a slider 460 that can be moved, e.g., dragged by a cursor, to a time of interest. FIG. 9A shows the slider 460 moved to time t1, which corresponds to the first point at which the threshold 404 was exceeded, from the original position. After the slider 460 has been moved, a synchronize to map button 462 can be activated, e.g., clicked, to redraw the map 300 to the time pointed to by the slider 460. By storing network configuration information over time, triggers having a possible relationship to a configuration change can be identified.

The graphical display 400 can also provide a user with the ability to drag the threshold 404 to a different value 405 (shown in dotted line). With this arrangement, a user can quickly modify a threshold for a given device.

Another aspect of the invention is shown in FIG. 100, which shows a graphical display 500 with actual operating data 502 graphed along with first and second statistical bands 504a,b. As used herein, statistical bands refer to a region 506 defined by a statistical relationship to actual data 502 for one or more object metrics.

In one particular embodiment, the statistical bands 504 are shown for a predetermined number of standard deviations from actual operating metric data averaged over time. It is understood that the bands 504 can be derived from "moving" data or from a "frozen" set of data. A wide range of schemes for selecting and updating data for generation of the statistical bands can be readily developed by one of ordinary skill in the art without departing from the present invention.

The number of standard deviations can be selected based upon how much of the population the user desired to include. In one embodiment, the number of standard deviations from actual metric data can range from about 1.0 standard deviations to about 3.0 standard deviations. In one particular embodiment, the number of standard deviations selected is about 2.0 standard deviations. It is understood that the number of standard deviations should balance generating meaningful triggers. A low number of standard deviations may generate an excessive number of triggers while a high number of standard deviations may not generate triggers in the presence of network performance issues.

In one embodiment, the statistical bands display 500 is activated by a tab 508 at the top of the graph. The statistical bands 504 can be displayed for various data rollups e.g., hourly, weekly, monthly, etc., via a data rollup menu box 510. More particularly, a user has the option to allow the statistical band region 506 thresholds 504*a,b* to be set based upon historical data using the data rollup button 510. For example, the statistical bands 504 can be defined from actual data from the past week, month, etc. With this arrangement, a user can set meaningful thresholds without a high level of familiarity for particular devices and configurations. That is, a user may not have a good sense of what an excessive response time is for a particular device. By selecting statistical bands 504 for a given device based upon historical data, thresholds can be set easily that can generate meaningful triggers.

Figure 11:
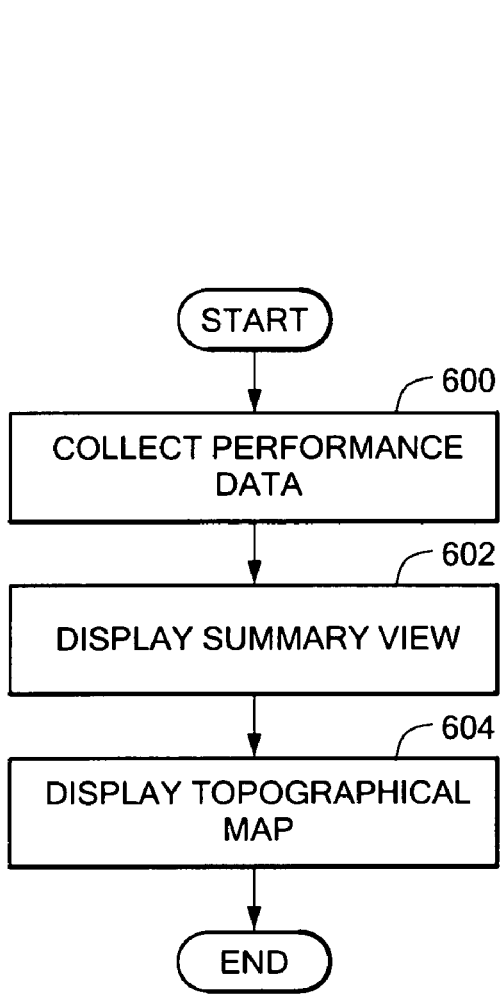
FIG. 11 is a high-level flow diagram showing an exemplary sequence of steps for implementing performance monitoring of network objects in accordance with the present invention.

FIG. 11 shows an exemplary sequence of steps for implementing performance monitoring of network objects in accordance with the present invention. In step 600, performance data for network objects for one or more metrics is collected at predetermined time intervals and stored. In one embodiment, a user can select the granularity, e.g., time interval, that data is collected. In step 602, in response to a user action, a summary view of time-stamped trigger information is displayed, such as the summary of FIG. 3. In an exemplary embodiment, the trigger information is displayed in regions corresponding to predetermined network object types. From the summary view, a user can ascertain a high level understanding of network performance. In step 604, a user can select a cell, such as by double clicking on the cell, to view a topographical map for the associated time, as described above and in FIG. 12 below.

It is understood that in view of the interactive nature of the inventive network performance monitoring system various steps described in the flow diagrams should generally be considered optional and without any particular ordering. Since a user selects the various displays, it is understood that a particular view may not be requested for a given scenario and that a view may be displayed from various interactive paths under user control.

Figure 12:
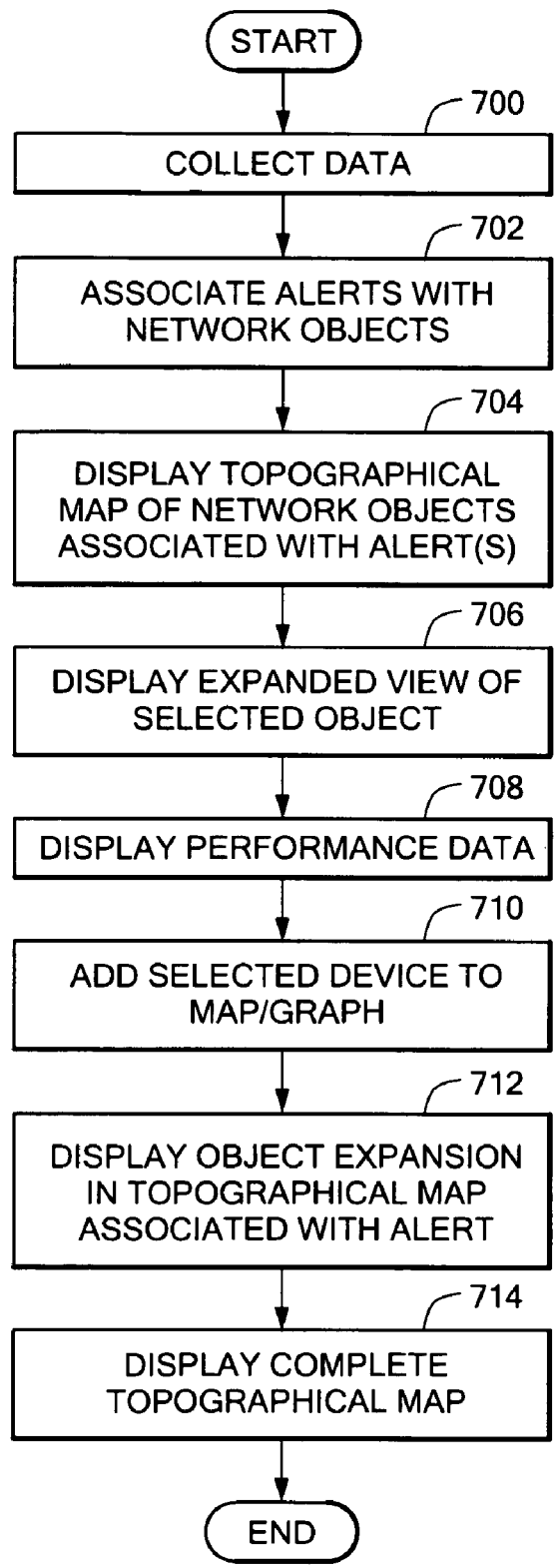
FIG. 12 is a flow diagram showing an exemplary sequence of steps for implementing a display a topographical map of network objects in view of performance data in accordance with the present invention.

FIG. 12 shows an exemplary sequence of steps for implementing network object performance monitoring with a topographical view in accordance with the present invention. In step 700, performance data for one or more metrics is collected and stored over time. The data is collected at specified time intervals. In one embodiment, a user can select the granularity, e.g., time period, for which data is collected. In step 702, triggers are associated with one or more network objects. For example, a disk device may exceed a threshold set by a user for number of writes per second at a given time, which can result in the generation of an trigger. In step 704, in response to a user instruction, a topographical map of network objects is displayed of objects having some type of association with one or more of the triggers, such as shown in FIG. 4. As described above, the topographical map may be generated in response to a user double clicking on a given time cell in a summary view.

In step 706, in response to user interaction, a network object marked as associated with an trigger is expanded to display additional detail. For example, as shown in FIG. 5, the map view can show a list of devices coupled to given object, such as a disk device. In step 708, a user can view actual performance data for the listed devices for a selected metric. The user can also optionally select one or more of the listed devices in step 710 for addition to the map and/or addition to a graphical display. A listed device may be flagged as a root cause of the trigger based upon actual data in comparison to a selected metric for a given time. That is, a listed device can be visually marked as a root cause after exceeding a given threshold for a selected metric.

In step 712, a user can expand other network objects that may be visually indicated to be associated with one or more triggers, as shown in FIG. 6. In step 714, the user can expand the map as desired to view more complete topographical information as shown in FIG. 7.

Figure 13:
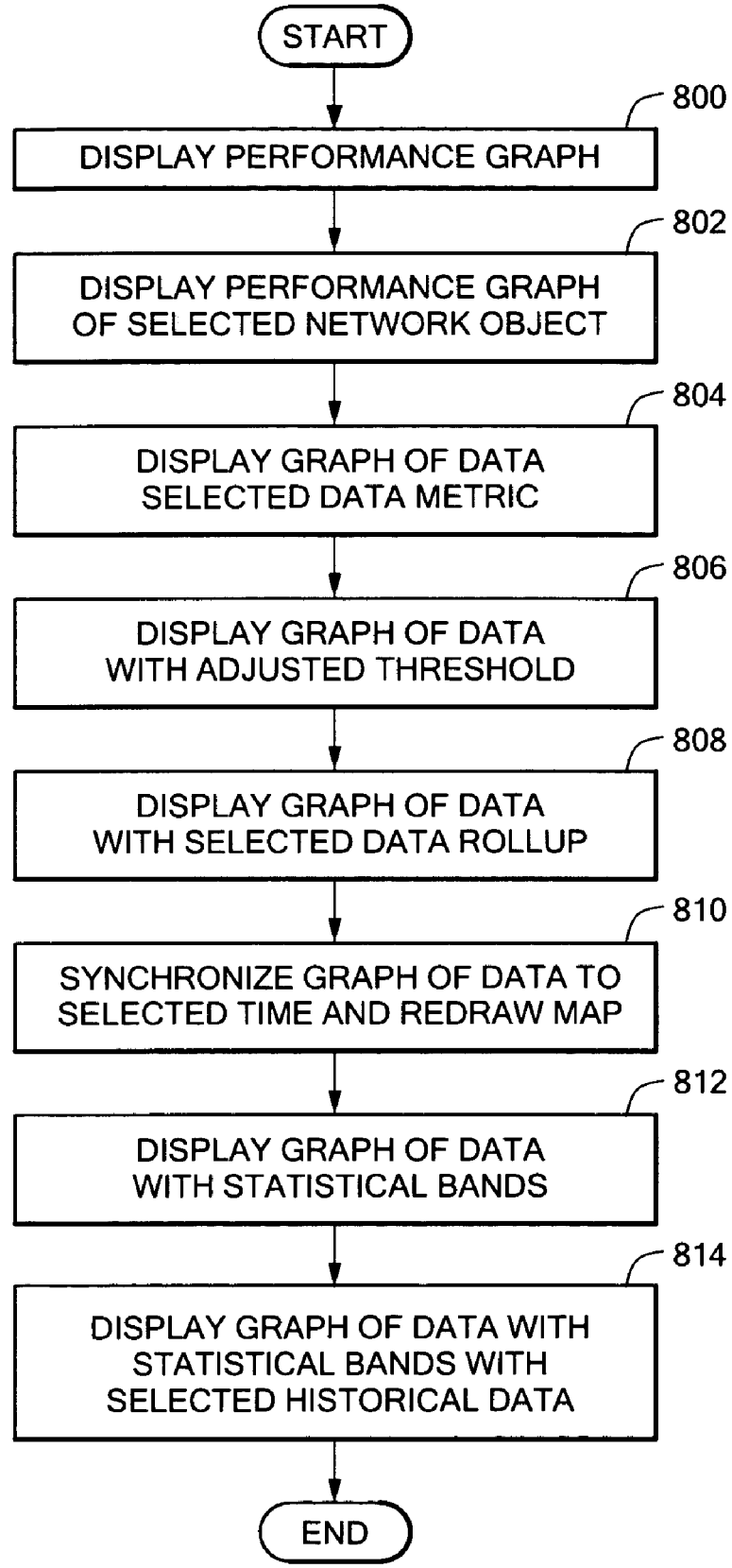
FIG. 13 is a flow diagram showing an exemplary sequence of steps for implementing a graphical display of performance data of network objects in accordance with the present invention.

FIG. 13 shows an exemplary sequence of steps for implementing graphical display of object performance data for a performance monitoring system in accordance with the present invention. In general, the graphical display can be optionally generated in conjunction with the topographical map. However, in other embodiments the graphical views are displayed without the map.

In step 800, a graphical display is generated of performance data over time for a given metric along wit a selected threshold, such as shown in FIG. 9. The number and time(s) at which the threshold was exceeded can be readily determined by a user. In step 802, the user selects a further network object for which device data should be displayed. For each selected object, a tab can be associated with the device. In step 804, the user selects a metric for display, such as via a pull down menu 450 (FIG. 9). In step 806, the user can optionally adjust the threshold, such as by dragging the threshold with a cursor to a desired level, such as shown in FIG. 9A. The user can also select in step 808 a data rollup for the displayed data, such as via a data rollup selection menu 452. Exemplary data rollup options include real time, hourly, daily, weekly, monthly, etc.

In step 810, a user can move a slider 460, as shown in FIG. 9A, to select a time for which the graphical display can be synchronized to the map. Since network configuration data is stored at predetermine time intervals, a user can identify performance issues due to configuration changes made in the network.

Figure 10:
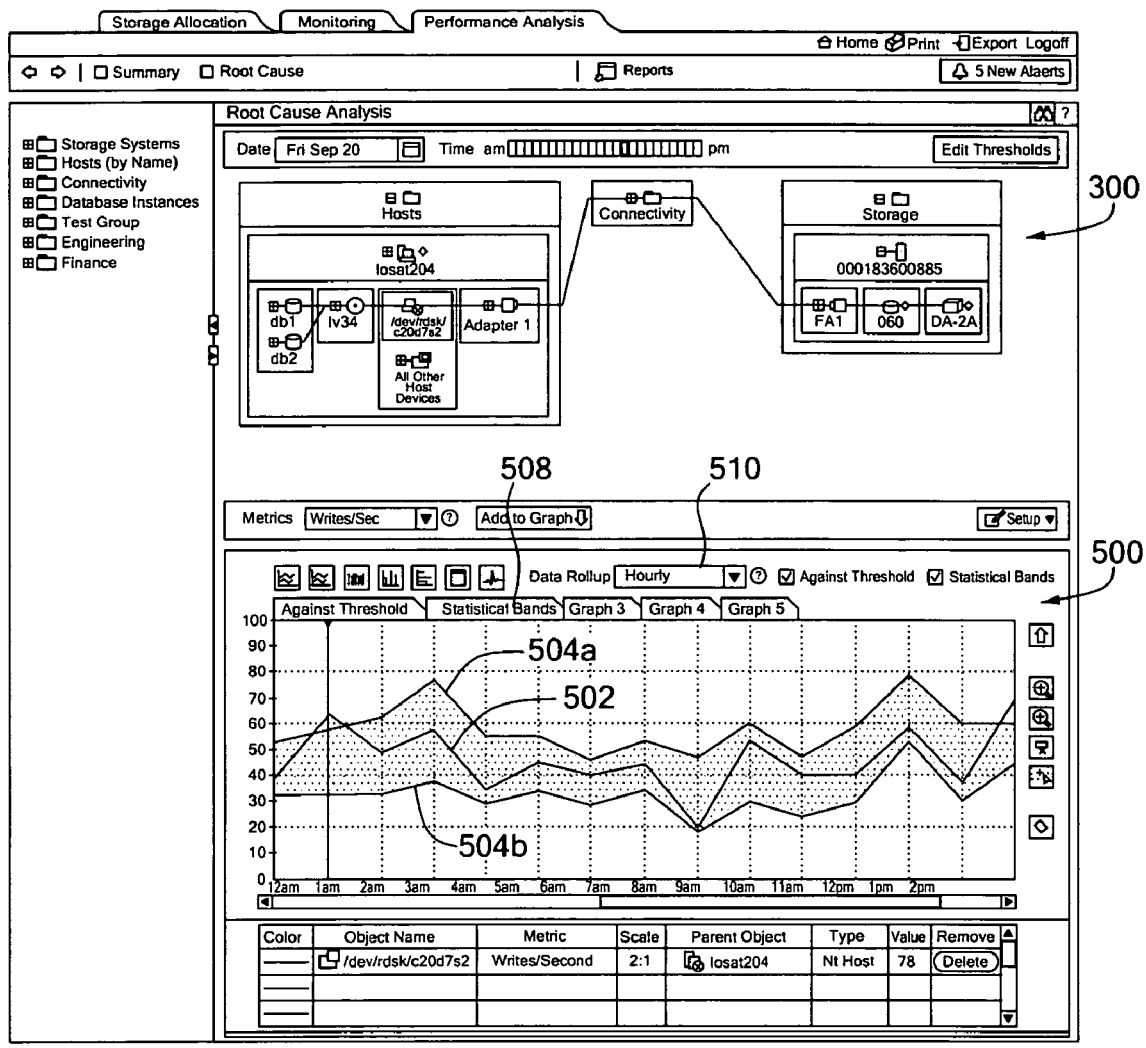
FIG. 10 is an exemplary display screen showing a graphical display of network object performance data and statistical bands in accordance with the present invention.

In step 812 a user can select data display with statistical bands 504 as shown in FIG. 10. The statistical bands can be defined by a statistical relationship to historical data for a selected period of time. In an exemplary embodiment, the statistical bands are defined as about 1.5 standard deviations from actual data. In step 814, the user can select the period of time, e.g., the past month, for which collected data should be used to generate the statistical bands.

In another aspect of the invention, triggers can be defined based upon a logical relationship among one or more metrics. For example, an trigger can be defined to be generated by a response time greater than a first threshold AND a read per second time greater than a second threshold. As another example, a threshold must be exceeded more than a predetermined number of times within a given time interval, e.g., a response time exceeds a threshold five times within two seconds.

Figure 14:
FIG. 14 is an exemplary screen display showing trigger selection in accordance with the present invention.

FIG. 14 shows an exemplary display 1000 for enabling a user to set one or more trigger thresholds for a given device. The set trigger display 1000 includes an object type input 1002, which is shown in the form of a pull-down menu, and an object selection input 1004 to enable a user to identify the object for which triggers are to be set. Objects can be displayed in a menu format such that objects can be selected from listed user-defined groups, e.g., finance group. The user group can be expanded until a desired object is displayed. A first metric can be selected in a first metric menu 1006 and an operator can be selected in a first operator pull-down menu 1008. Exemplary metrics are described above and illustrative operators include greater than, greater than or equal to, less than, less than or equal to, equal, etc. A second metric, if desired, can be selected in a second metric menu 1010 and an operator for the second metric can be selected in a second operator pull-down menu 1012. An logical relationship between the first and second metrics can be selected in a logical operator menu 1014. Exemplary logical operators include AND and OR.

While the exemplary trigger selection screen is shown having pull down menus, for example, it is understood that a wide variety of user interface mechanisms and formats can be used that are well known to one of ordinary skill in the art without departing from the present invention. In addition, it is understood that embodiments can logically combine metric thresholds for multiple objects to define one or more triggers.

Figure 15:
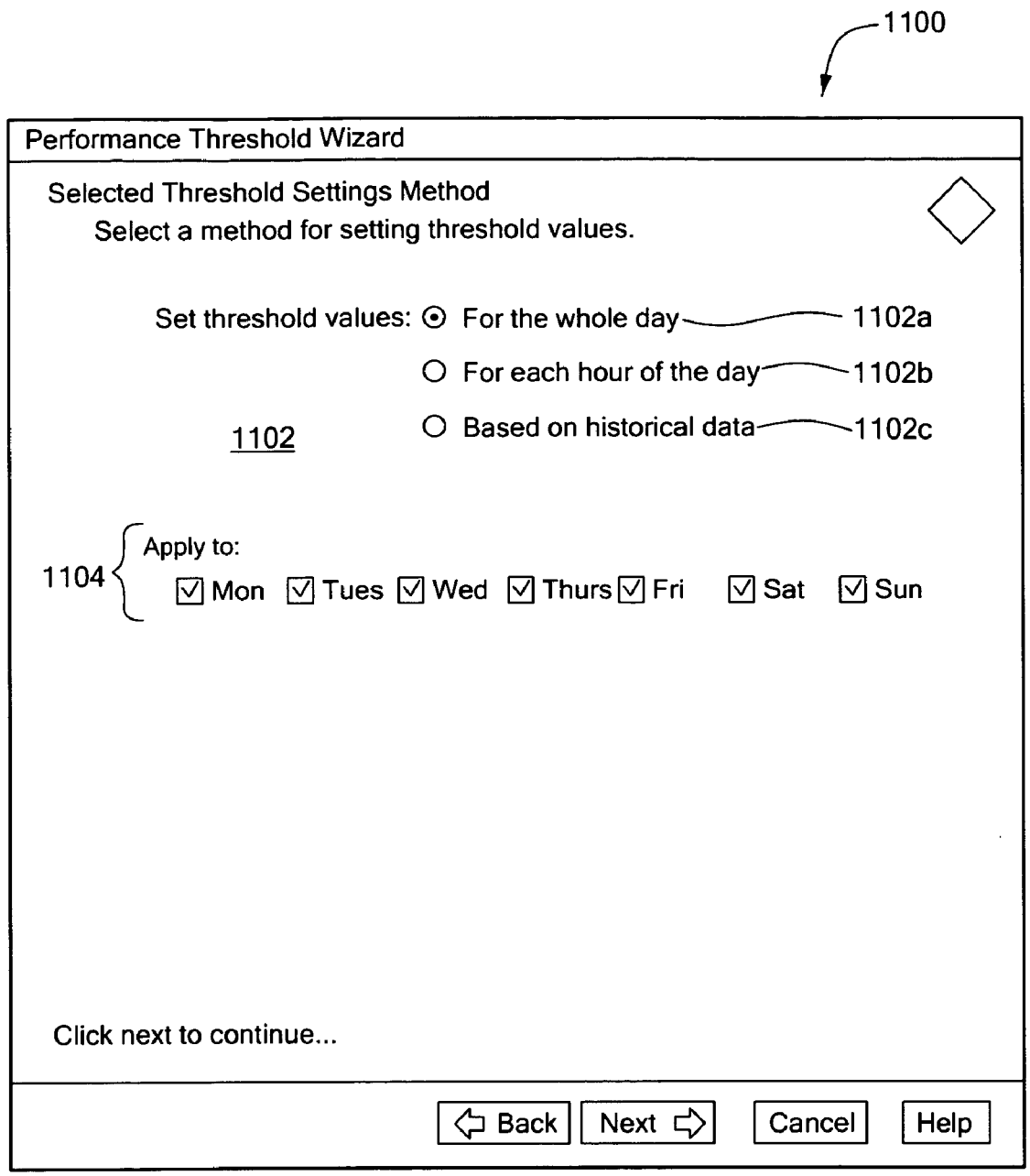
FIG. 15 is an exemplary screen display showing further details of trigger selection in accordance with the present invention.

FIG. 15 shows an exemplary screen 1100 that can be used to enable a user to set triggers based upon a desired time interval. A threshold value menu 1102 can include options for setting thresholds for the whole day 1102*a,* for each hour of the day 1102*b,* and for historical data 1102*c.* An interval selection menu 1104 enables a user to select those days, for example, for which the trigger information should apply. It will be appreciated that intervals can have a range of granularities other than days and that further threshold values other than whole day, each hour, and historical data are easily possible.

Figure 16:
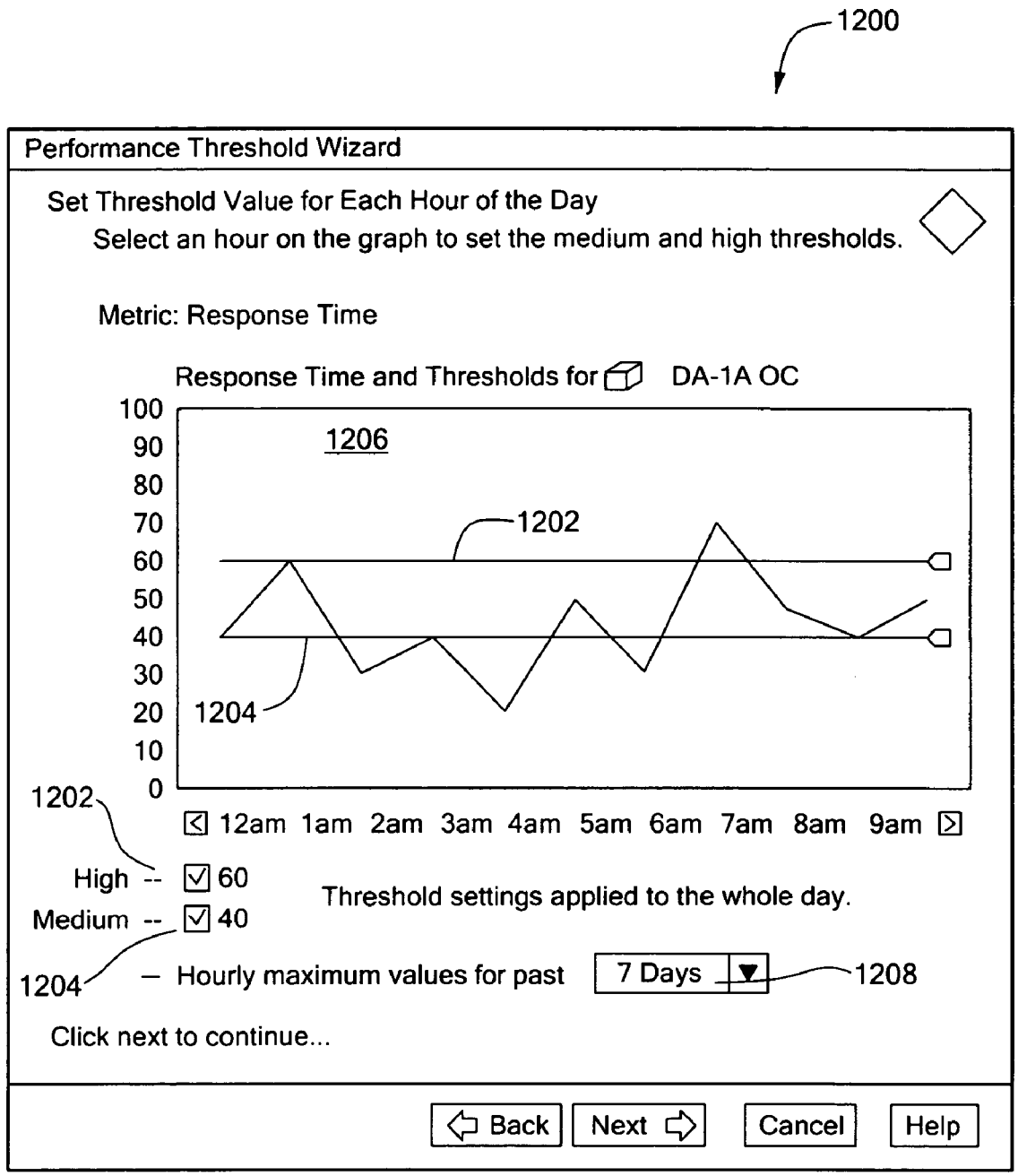
FIG. 16 is an exemplary screen display showing trigger selection for time intervals in accordance with the present invention.
Figure 16A:
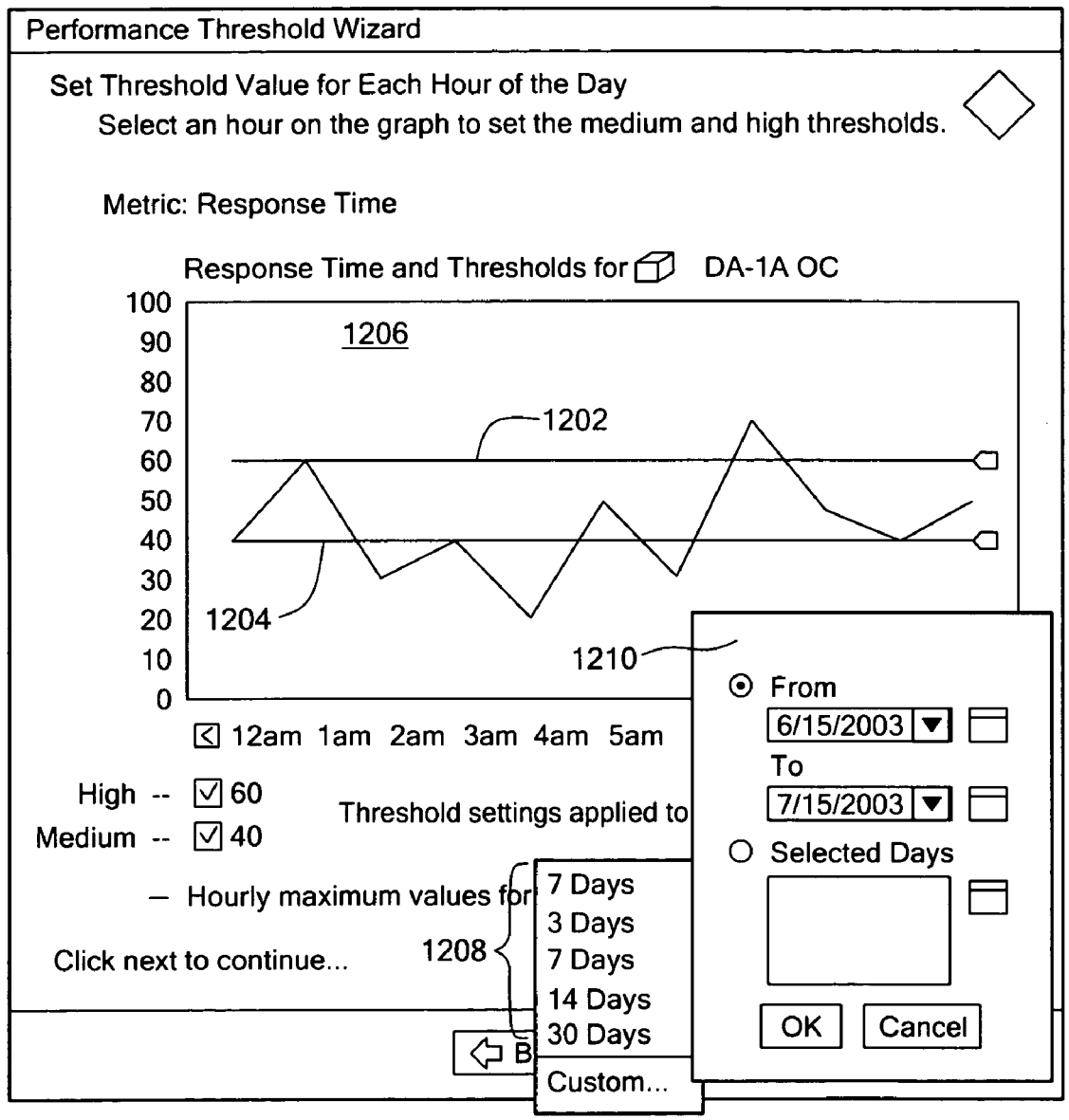
FIG. 16A is an exemplary screen display showing further details of trigger selection for time intervals in accordance with the present invention.

FIG. 16 shows an exemplary display 1200 that can be used to enable a user to set thresholds for a selected interval. In the illustrative display 1200, a response time metric for a selected object, here shown as disk adapter DA-1A OC, can have a high threshold 1202 and a medium threshold 1204. A graphical display 1206 can include horizontal lines for the high threshold 1204 and the medium threshold 1202 along with a graph of some historical data, here shown as hourly maximum values for the past 7 days. The display 1200 can include a menu 1208 to enable a user to select data to be displayed on the graph 1206. As shown FIG. 16A, the menu 1208 can include a pull down menu to provide selections such as 3 days, . . . , 30 days, and custom date range, for which data can be entered by a calendar box 1210. The custom date information can be entered using a wide variety of interface mechanisms and formats.

Figure 17:
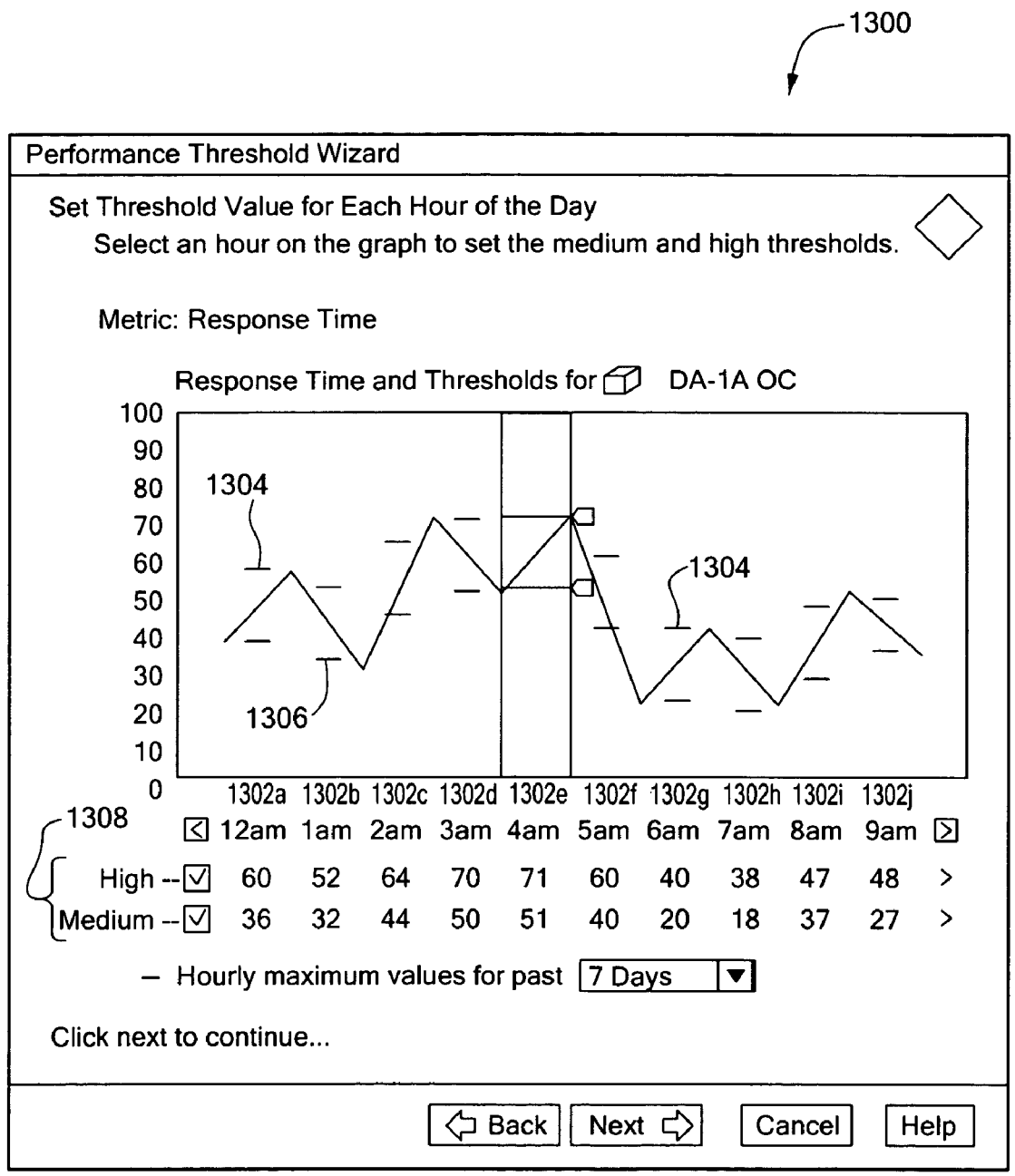
FIG. 17 is an exemplary screen display showing a further embodiment of trigger selection in accordance with the present invention.

FIG. 17 shows an exemplary screen 1300 for enabling a user to set threshold values for particular intervals, here shown as each hour of the day. For each hour interval 1302*a-j,* a high threshold value 1304 and a medium threshold value 1306 can be entered by a user. In an exemplary embodiment, the user can move the horizontal line associated with the high or medium interval for the selected hour to a desired level using a mouse in a convention "drag" operation. The user can also enter threshold information numerically in the listed threshold value table 1308.

FIG. 18 shows an exemplary display 1400 showing the existing thresholds for a particular object (DA-1A-OC) for first (response time) and second (writes/second) metrics for selected intervals (hourly). If the threshold(s) are exceeded, the user can determine whether a trigger should be generated by checking the alert box 1402.

It is understood that any number of thresholds can be set for a given object and that various logical relationships, including nested relationships, for the thresholds can be defined. It is further understood that a variety of thresholds and relationships can be readily defined by one of ordinary skill in the art to meet the requirements of a particular application without departing from the teachings of the present invention.

While certain types of network devices are shown in the exemplary embodiments contained herein, further device types for which performance can be monitored by the inventive system will be readily apparent to one of ordinary skill in the art. Further, it is contemplated that objects and devices not yet known may be incorporated and monitored in future networks.

In addition, the views shown herein are intended to facilitate an understanding of the invention. The views may have certain inconsistencies in time and performance graphing and the like from which no inference should be drawn. Further, it is understood that the network map, connections, and objects are intended to describe a hypothetical network. One of ordinary skill in the art will appreciate that a network can have infinite variations in size, components, connections, storage configurations, hosts, connectivity, databases, etc. without departing from the present invention. In addition, the term cells as used herein should be construed broadly to cover any type of display area that can be associated with a given time interval. Further, while the summary view is shown having a series of regions with associated cells, it is understood that the summary view need not contain any particular number or type of regions.

The present invention provides a network performance monitoring system for enabling a user to readily identify network problems. The system generates a map showing objects, logical and physical, that are relevant for solving a performance problem. The system can also filter objects and the like that are not necessary for the user to view. By using the generated map, the user can identify the source of a performance problem.

In another aspect of the invention, a user can attempt to identify a root cause of one or more triggers from performance information for a plurality of network objects for one or more metrics. In one embodiment, performance information for a first metric for a first network object can be displayed in a first region and performance information for a second metric for a plurality of network objects can be displayed in a second region. The user can select the time corresponding to the performance information. In one embodiment, the user can select the time at a granularity of the data collection to enable identification of relatively transient performance issues. The granularity of performance data collection, e.g., minutes, can be significantly greater than the time cells, e.g., hourly, described above for, example.

FIG. 19 shows an exemplary root cause GUI 2000 having a map region 2002 showing network topographical information and a graph region 2004 showing metric performance information. The map region 2002 includes a host device region 2006, a connectivity region 2008, and storage device region 2010. Devices in the map region 2002 associated with a trigger firing, e.g., exceeding a trigger, are marked with a first indicator 2012 (trigger fired) or a second indicator 2014 (device selected), as described above. In the illustrated embodiment, a given host device 2016 (/dev/rdsk/c20d7s2) is selected as indicated by the dark border. A graph 2018 of a first metric, shown as response time 2020 versus time 2022 for the selected host device 2016 is displayed in the graph region 2004. It is understood that graphed response time can have any granularity including to the resolution at which data is collected for the network objects.

Figure 20:
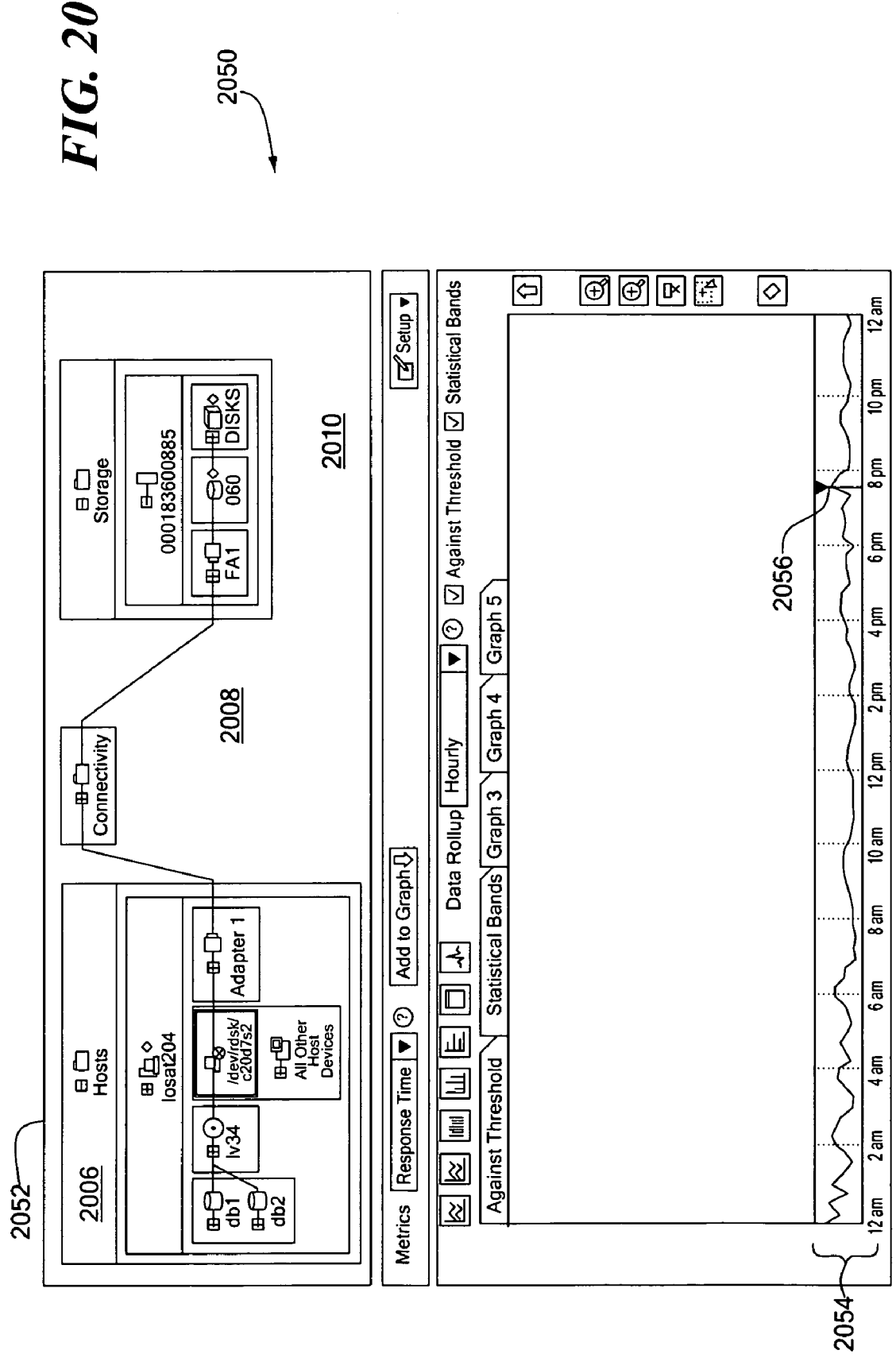
FIG. 20 is an exemplary screen display having the first area of FIG. 19 compacted.

FIG. 20 shows an exemplary screen display 2050 having a map region 2052 and a compact graph region 2054 that is similar to the graph region 2004 shown in FIG. 19, although shrunken in amplitude. The compact graph region 2054 shows metric performance information for the first metric (response time) for the selected device 2016.

The performance information for the first metric is displayed in a relatively compact area 2054 to enable the display of additional information, as described further below. The graph region 2054 includes a time indicator 2056, which can be provided as a cursor that is movable by the user. In one embodiment, the information displayed in the map region 2052 and the display in FIG. 21 described below, is updated to the time set by the cursor 2056.

In general, the compact graph region 2054 and the graph region 2004 of FIG. 19 should match with each other in terms of data values. However, the graph 2054 does not have a horizontal scroll bar, it is compacted both horizontally and vertically from the original graph 2004 in FIG. 19.

Figure 21:
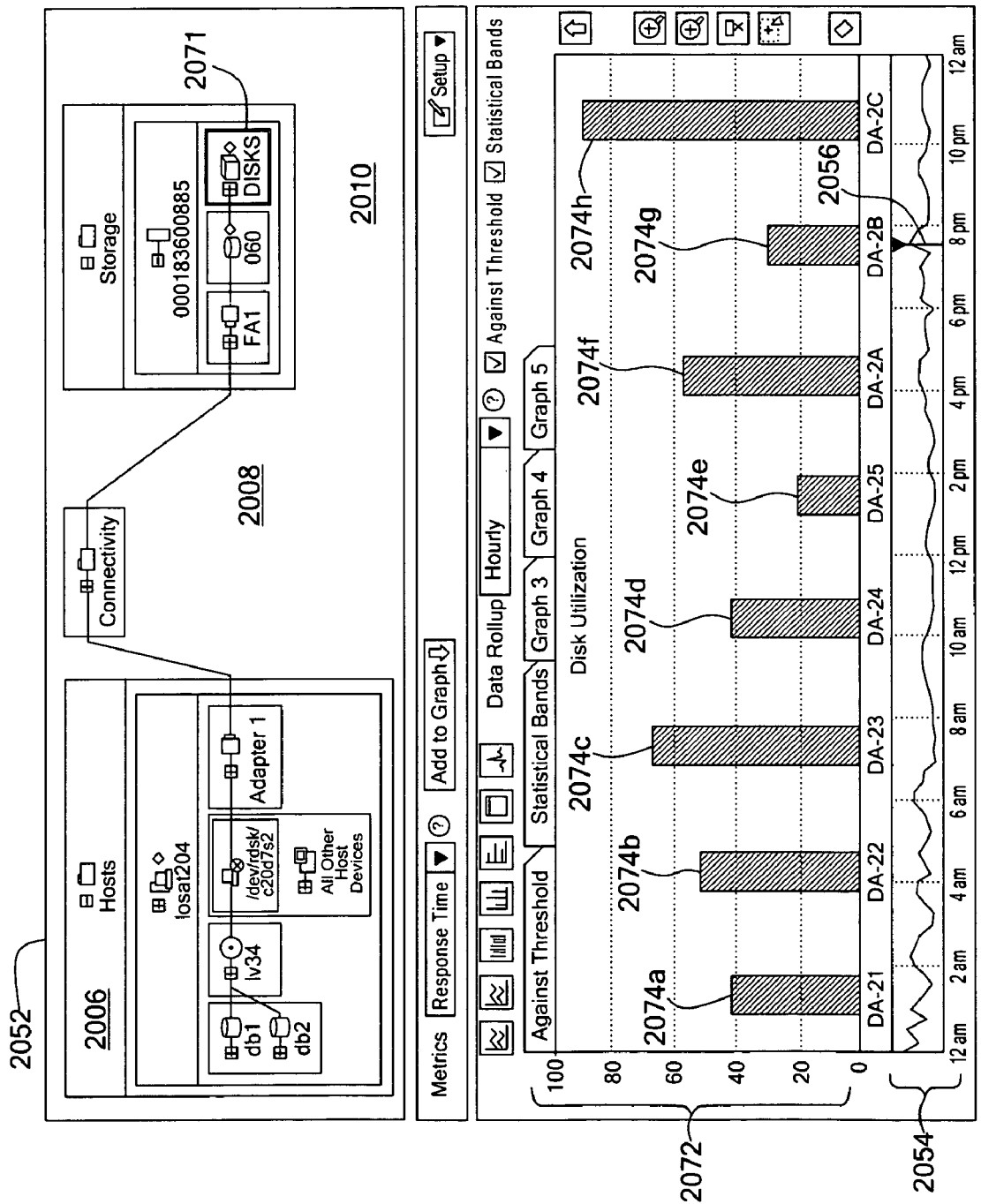
FIG. 21 is an exemplary screen display having a second graph area showing performance data for a plurality of devices for a time point specified in the first graph area.

FIG. 21 shows an exemplary screen display 2070 having a device performance area 2072 in addition to the compact graph 2054 of performance information and map 2052 of FIG. 20. Note that network object group disks 2071, which is expandable, is selected in the storage region 2010 of the map region 2052. The device performance area 2072 shows information for a second metric, e.g., disk utilization, for a number of devices 2074a-h at a given time. The time for which the metric information is displayed corresponds to the cursor 2056 in the compact graph region 2054. In one embodiment, the user can move the cursor to a desired time. In an alternative embodiment, the cursor is automatically placed at a time based upon predetermined criteria. After movement of the cursor, the information in the metric region 2072 and the map region 2052 can be updated to reflect the time corresponding to the cursor.

The particular devices 2074 displayed in the second graph area 2072 can be selected in a variety of ways. In one embodiment, a user can select the devices using a dialog box, such as the dialog box 350 of FIG. 5. In another embodiment, devices associated with the selected device, shown as host device 2016, are selected.

It is understood that a wide range of mechanisms and criteria can be used to select devices for display in the second graph area 2072. No inferences should be drawn from what devices are shown and what devices are not shown in the second graph area 2072 of FIG. 21.

In the illustrative embodiment, the response time of host device c20d7s2 is a performance issue symptom, while the disk utilization of the disks 2071 is the root cause of the symptom]

With this arrangement, a user can drill down to a given time subject to the resolution of data collection. For example, if data is collected every minute, then a user can display performance data at the resolution of one-minute intervals. In addition, performance data for a plurality of interconnected devices can be analyzed to determine the collective impact on the performance of an associated device. By enabling the display of data at the resolution of data collection for multiple related devices, a user can more effectively locate relatively transient performance issues.

Figure 22:
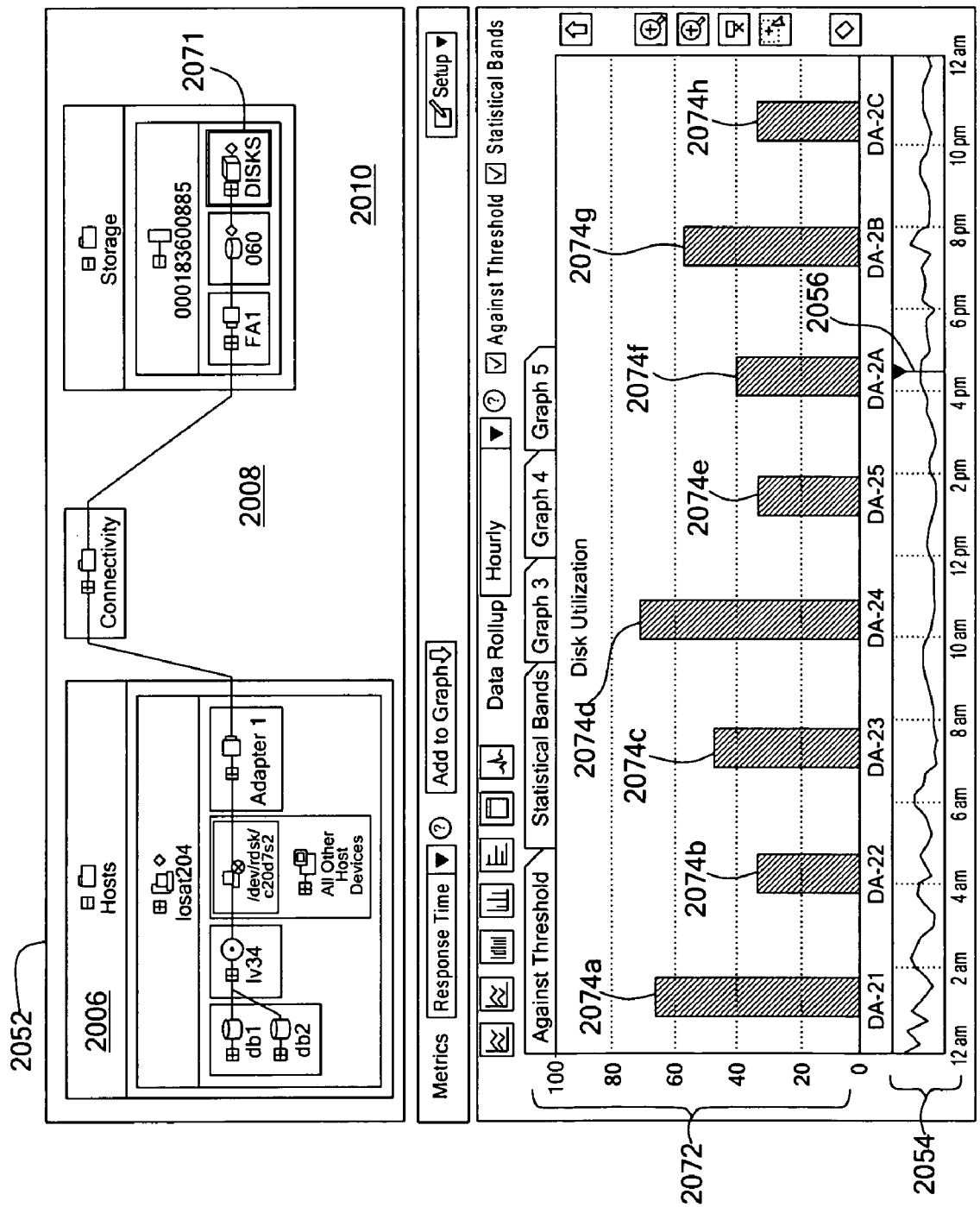
FIG. 22 is an exemplary screen display at different time than the display of FIG. 21.

FIG. 22 shows a further screen display 2070' similar to that shown in FIG. 21 with the cursor 2056 in the first graph region 2054 moved to a different time. The displayed device performance data 2072 in the second graph region 2072 is updated to reflect the selected time, e.g., about 4:20 pm. The map region 2052 would be updated to reflect any network configuration changes.

Figure 23:
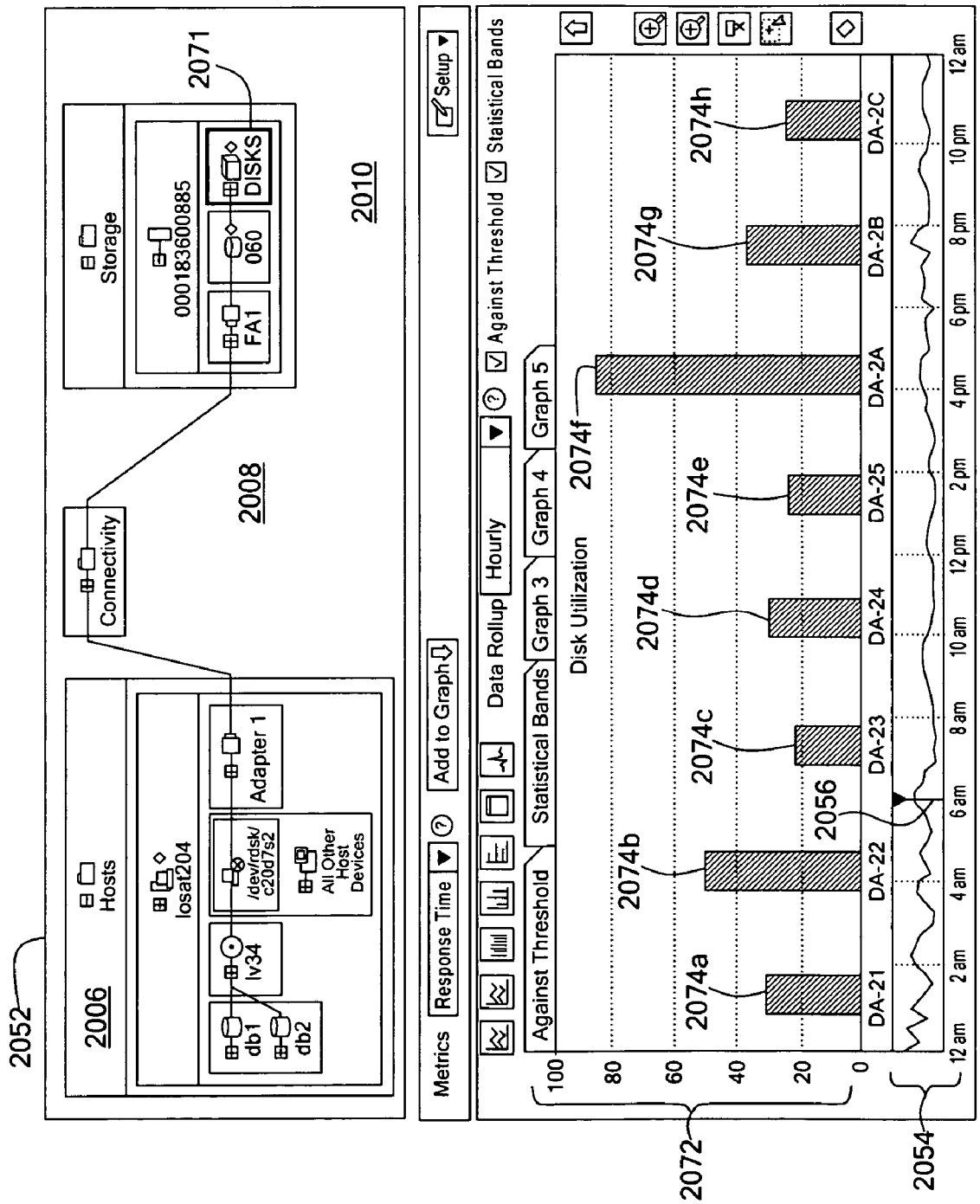
FIG. 23 is an exemplary screen display showing one of the plurality of devices of FIG. 22 selected by a user.

FIG. 23 shows another screen display 2080 similar to that shown in FIGS. 21 and 22 showing the cursor 2056 moved to another time, shown as about 6:00 am. The device performance information for the second metric, e.g., disk utilization, is shown in the s second graph area 2072 for the devices 2074a-h. A particular device 2074f, e.g., DA-2A, can be selected by a user as indicated by the dark border, for example.

Figure 24:
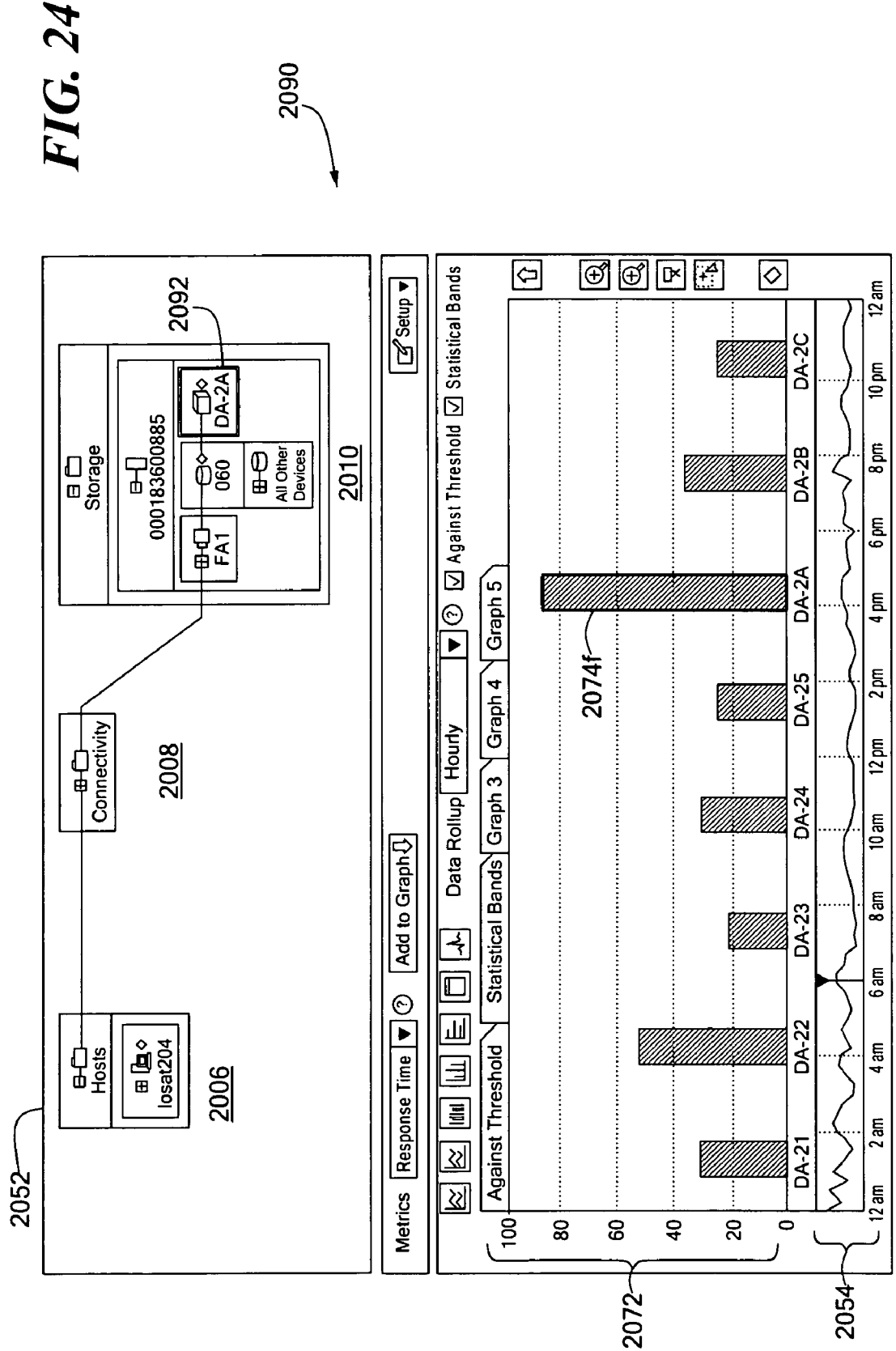
FIG. 24 is an exemplary screen display showing a map region updated to reflect the device selected and the time point specified in FIG. 23.

By selecting a particular device, the map region display 2052 is updated to select that device, as shown in FIG. 24. More particularly, the device 2074h (DA-2A) is selected in the storage region 2010 of the map 2052, as indicated by the dark border 2092. Other devices associated with that device can be displayed in the map region 2052, as described above.

The user can continue to select and expand the map region, as described above, to facilitate identification of a root cause for a performance issue. The user can select various devices to be shown in the second graph area to attempt to locate root causes. With this arrangement, a user can examine a first graph region and easily identify at what time points there are performance problems. The user can then quickly select that time on the first graph and utilize the map and a second graph region to locate the root cause of a network performance problem.

Figure 25:
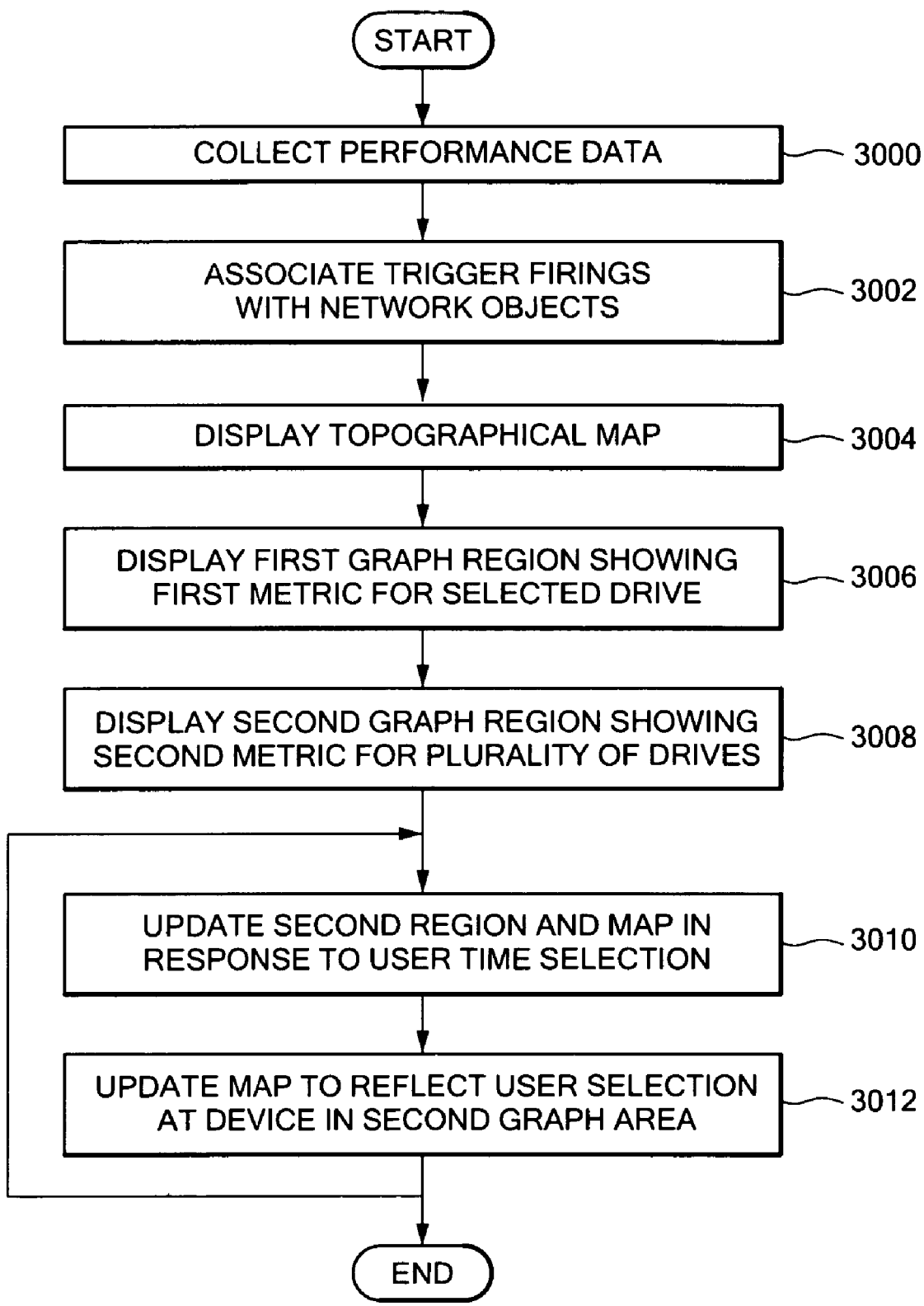
FIG. 25 is a flow diagram showing an exemplary sequence of steps to implement providing detailed network object performance information in accordance with the present invention.

FIG. 25 shows an exemplary sequence of steps to implement displaying detailed network object performance information in accordance with the present invention. In step 3000, data is collected for the network objects at predetermined intervals, e.g., one minute. Network topographical information can also be collected at the same or different time interval so that network changes can be displayed in a map region over time. In step 3002, trigger firings, e.g., exceeded thresholds, are associated with the network objects to identify potential root causes of network performance issues. A topographical map is displayed in step 3004 showing various network objects that may be associated with trigger firings and/or objects associated with the identified network objects.

In step 3006, a first graph region is displayed. In one embodiment, the first graph region includes performance data over time for a first metric for a first network object. The first graph region can include a time indicator, such as a cursor, to indicate the time corresponding to the displayed performance data for the first metric. The performance data can be relatively compact to enable the display of a second graph region in step 3008 showing performance data for a plurality of network objects for a second metric (at a particular time point specified in the first graph region). It is understood that the first and second metrics can be the same or different.

In one embodiment, the performance data in the second graph area has a resolution corresponding the resolution of the collected data. That is, if data is collected at 30-second intervals, then data can be displayed at 30-second intervals. In one embodiment, the user can change the time scale to display a desired time interval and can step through each collection point to examine transient performance issues. In an exemplary embodiment, the user can select the resolution at which to display the performance information in the second graph area.

In step 3010, the performance data in the second graph region and/or the map region is updated in response to any user movement of the time cursor in the first graph region. The user can move the cursor to examine data for a desired time. In step 3012, the map is updated to reflect a user selection of a particular one of the devices in the second graph region. The map display is updated to select the corresponding device in the map to enable a user to expand the device and examine associated devices. The map and second graph area can be updated in steps 3010 and 3012 in response to further user time and device selections.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of displaying network performance information, comprising:
   storing performance information for objects in a network at predetermined time intervals;
   identifying network objects that are a potential root cause of one or more trigger firings in the network;
   displaying an end to end host-to-storage topographical map of the network including at least one of the identified network objects, the topographical map comprising:
      a host region not including storage devices or connectivity devices and comprising at least one of the identified network objects associated with hosts in the network;
      a storage region not including hosts or connectivity devices and comprising at least one of the identified network objects associated with storage devices in the network; and
      a connectivity region not including hosts or storage devices and positioned between the host region and the storage region and comprising at least one of the identified network objects associated with connectivity devices in the network configured to be connected to at least one of the hosts and the storage devices in the network;
   displaying a first performance region providing performance information for at least one of the identified network objects; and
   displaying a second performance region providing graphical performance information for a plurality of the network objects at a first time specified in the first performance region by a time indicator.

2. The method according to claim 1, wherein the at least one identified network object is selected in the topographical map.

3. The method according to claim 2, further including displaying in the map network objects associated with one or more of the identified network objects.

4. The method according to claim 1, wherein the time indicator is movable by a user.

5. The method according to claim 4, wherein the time indicator includes a cursor.

6. The method according to claim 4, wherein the map, the first performance region and the second performance region are synchronized to the time indicator.

7. The method according to claim 1, further including receiving user selections of the plurality of network objects displayed in the second performance region.

8. The method according to claim 1, wherein plurality of the network objects in the second performance region can be displayed in the topographical map.

9. The method according to claim 1, wherein the first performance region provides performance information for a first metric and the second performance region provides information for a second metric.

10. The method according to claim 1, further including receiving a user selection of a first one of the plurality of the network objects in the second performance region and updating the topographical map to reflect the user selection.

11. The method according to claim 10, further including updating the topographical map to display objects associated with the first one of the plurality of network objects in the second performance region.

12. The method according to claim 1, wherein the performance information in the second performance region is displayed at a resolution corresponding to the predetermined time intervals.

13. A network performance monitoring system, comprising:
   a processor;
   a memory coupled to the processor, the memory including program instructions for enabling displaying performance information for objects in a network by:
   storing performance information for the objects in the network at predetermined time intervals;
   identifying network objects that are a potential root cause of one or more trigger firings in the network;
   displaying an end-to-end host-to-storage topographical map of the network including at least one of the identified network objects, the topographical map comprising:
      a host region not including storage devices or connectivity devices and comprising at least one of the identified network objects associated with hosts in the network;
      a storage region not including hosts or connectivity devices and comprising at least one of the identified network objects associated with storage devices in the network; and
      a connectivity region not including hosts and storage devices and positioned between the host region and the storage region and comprising at least one of the identified network objects associated with connectivity devices in the network configured to be connected to at least one of the hosts and the storage devices in the network;
   displaying a first performance region providing performance information for at least one of the identified network objects; and
   displaying a second performance region providing graphical performance information for a plurality of the network objects at a first time specified in the first performance region by a time indicator.

14. The system according to claim 13, wherein the at least one identified network object is selected in the topographical map.

15. The system according to claim 14, further including displaying in the map network objects associated with one or more of the identified network objects.

16. The system according to claim 13, wherein the time indicator is movable by a user.

17. The system according to claim 16, wherein the time indicator includes a cursor.

18. The system according to claim 16, wherein the map, the first performance region and the second performance region are synchronized to the time indicator.

19. The system according to claim 13, further including receiving user selections of the plurality of network objects displayed in the second performance region.

20. The system according to claim 13, wherein plurality of the network objects in the second performance region can be displayed in the topographical map.

21. The system according to claim 13, wherein the first performance region provides performance information for a first metric and the second performance region provides information for a second metric.

22. The system according to claim 13, further including receiving a user selection of a first one of the plurality of the network objects in the second performance region and updating the topographical map to reflect the user selection.

23. The system according to claim 22, further including updating the topographical map to display objects associated with the first one of the plurality of network objects in the second performance region.

24. The system according to claim 13, wherein the performance information in the second performance region is displayed at a resolution corresponding to the predetermined time intervals.

25. An article, comprising:
a storage medium having stored instructions that when executed by a machine result in the following:
storing performance information for objects in a network at predetermined time intervals;
identifying network objects that are a potential root cause of one or more trigger firings in the network;
displaying an end-to-end host-to-storage topographical map of the network including at least one of the identified network objects, the topographical map comprising:
a host region not including storage devices or connectivity devices and comprising at least one of the identified network objects associated with hosts in the network;
a storage region not including hosts or connectivity devices and comprising at least one of the identified network objects associated with storage devices in the network; and
a connectivity region not including hosts or storages devices and positioned between the host region and the storage region and comprising at least one of the identified network objects associated with connectivity devices in the network configured to be connected to at least one of the hosts and the storage devices in the network;
displaying a first performance region providing performance information for at least one of the identified network objects; and
displaying a second performance region providing graphical performance information for a plurality of the network objects at a first time specified in the first performance region by a time indicator.

26. The article according to claim 25, wherein the time indicator is movable by a user.

27. The article according to claim 26, wherein the map, the first performance region and the second performance region are synchronized to the time indicator.

28. The article according to claim 25, wherein the first performance region provides performance information for a first metric and the second performance region provides information for a second metric.

29. The article according to claim 25, further including receiving a user selection of a first one of the plurality of the network objects in the second performance region and updating the topographical map to reflect the user selection.

30. The article according to claim 25, wherein the performance information in the second performance region is displayed at a resolution corresponding to the predetermined time intervals.

* * * * *